(12) United States Patent
Choi et al.

(10) Patent No.: US 12,537,391 B2
(45) Date of Patent: Jan. 27, 2026

(54) METHOD FOR WIRELESS CHARGING AND DEVICE SUPPORTING SAME

(71) Applicant: SAMSUNG ELECTRONICS CO., LTD., Suwon-si (KR)

(72) Inventors: Eunha Choi, Suwon-si (KR); Sungku Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 600 days.

(21) Appl. No.: 18/098,354

(22) Filed: Jan. 18, 2023

(65) Prior Publication Data

US 2023/0155418 A1 May 18, 2023

Related U.S. Application Data

(63) Continuation of application No. PCT/KR2022/010959, filed on Jul. 26, 2022.

(30) Foreign Application Priority Data

Aug. 5, 2021 (KR) .................. 10-2021-0103391

(51) Int. Cl.
*H02J 7/00* (2006.01)
*H02J 50/12* (2016.01)
(Continued)

(52) U.S. Cl.
CPC ............ *H02J 50/12* (2016.02); *H02J 7/0048* (2020.01); *H02J 50/402* (2020.01); *H02J 50/80* (2016.02); *H02J 50/90* (2016.02); *H04W 4/80* (2018.02)

(58) Field of Classification Search
None
See application file for complete search history.

(56) References Cited

U.S. PATENT DOCUMENTS 9,660,480 B2 5/2017 Yoon et al.
9,692,487 B2 6/2017 Jung et al.
(Continued)

FOREIGN PATENT DOCUMENTS

KR 10-2013-0033867 4/2013
KR 10-2014-0024565 3/2014
(Continued)

OTHER PUBLICATIONS

Korean Office Action issued Jul. 17, 2025 in corresponding Korean Patent Application No. 10-2021-0103391.
(Continued)

*Primary Examiner* — Arun C Williams
(74) *Attorney, Agent, or Firm* — Nixon & Vanderhye, P.C.

(57) ABSTRACT

A power transmitting unit (PTU) configured to support resonance wireless charging and induction wireless charging may include: a first coil for induction wireless charging, a second coil for resonance wireless charging, a wireless charging circuit electrically connected to the first coil and the second coil, a short-range wireless communication circuit, and at least one processor operatively connected to the wireless charging circuit and the short-range wireless communication circuit. The at least one processor may be configured to control the PTU to transmit a first signal for detecting at least one external electronic device through at least one of the first coil and the second coil, and receive, through the second coil, a feedback of the transmitted first signal from a first external electronic device among the at least one external electronic device, and in response to receiving the feedback, control the wireless charging circuit and transmit a first power for charging the first external electronic device in a resonance scheme, and identify whether a first region corresponding to the first coil and (Continued)

being at least partially flat is available, and based on the first region being available, determine whether to change a charging scheme of the first external electronic device from the resonance scheme to an induction scheme, and in response to determining to change the charging scheme of the first external electronic device into the induction scheme, transmit a control signal for charging using the induction scheme to the first external electronic device through the short-range wireless communication circuit.

20 Claims, 18 Drawing Sheets

(51) Int. Cl.
    *H02J 50/40*     (2016.01)
    *H02J 50/80*     (2016.01)
    *H02J 50/90*     (2016.01)
    *H04W 4/80*     (2018.01)

(56) References Cited

U.S. PATENT DOCUMENTS

| | | | |
|---|---|---|---|
| 9,953,763 B2 | 4/2018 | Uchida et al. | |
| 10,277,494 B2 | 4/2019 | Randell et al. | |
| 10,461,564 B2 | 10/2019 | Yeon et al. | |
| 10,523,062 B2 | 12/2019 | Bae | |
| 10,574,300 B2 | 2/2020 | Jung et al. | |
| 10,749,367 B2 | 8/2020 | Kim et al. | |
| 2007/0114967 A1* | 5/2007 | Peng | H02J 50/30 320/101 |
| 2010/0225272 A1* | 9/2010 | Kirby | H04B 5/266 320/108 |
| 2012/0052923 A1* | 3/2012 | Park | H04M 19/047 455/567 |
| 2013/0076306 A1 | 3/2013 | Lee et al. | |
| 2014/0117921 A1* | 5/2014 | Suomela | H02J 7/00047 320/103 |
| 2014/0347799 A1* | 11/2014 | Ono | G06F 1/1683 320/108 |
| 2015/0140927 A1 | 5/2015 | Chen et al. | |
| 2015/0303732 A1* | 10/2015 | Dow | H02J 50/90 320/108 |
| 2016/0006291 A1* | 1/2016 | Li | H02J 50/12 320/108 |
| 2017/0179752 A1 | 6/2017 | Shao et al. | |
| 2017/0279292 A1 | 9/2017 | Shirani-Mehr et al. | |
| 2017/0302097 A1 | 10/2017 | Kim et al. | |
| 2018/0262056 A1 | 9/2018 | Jung et al. | |
| 2018/0309325 A1 | 10/2018 | Lee et al. | |
| 2019/0229549 A1 | 7/2019 | Kosiba et al. | |
| 2020/0287426 A1 | 9/2020 | Granito et al. | |
| 2020/0381952 A1 | 12/2020 | Jung et al. | |

FOREIGN PATENT DOCUMENTS

| | | |
|---|---|---|
| KR | 10-2014-0024565 A | 3/2014 |
| KR | 10-1438884 | 9/2014 |
| KR | 10-2015-0021803 | 3/2015 |
| KR | 10-2017-0118433 | 10/2017 |
| KR | 10-2017-0130166 | 11/2017 |
| KR | 10-2017-0130974 | 11/2017 |
| KR | 10-2017-0130974 A | 11/2017 |
| KR | 10-2018-0117396 | 10/2018 |
| KR | 10-2125722 | 6/2020 |
| KR | 10-2168561 | 7/2020 |
| KR | 10-2198183 | 12/2020 |

OTHER PUBLICATIONS

Extended European Search Report dated Mar. 14, 2025 issued in European Patent Application No. 22853328.7.
International Search Report for PCT/KR2022/010959 mailed Nov. 3, 2022, 6 pages.
Written Opinion of the ISA for PCT/KR2022/010959 mailed Nov. 3, 2022, 4 pages.

* cited by examiner

METHOD FOR WIRELESS CHARGING AND DEVICE SUPPORTING SAME

CROSS-REFERENCE TO RELATED APPLICATIONS

This application is a continuation of International Application No. PCT/KR2022/010959 designating the United States, filed on Jul. 26, 2022, in the Korean Intellectual Property Receiving Office and claiming priority to Korean Patent Application No. 10-2021-0103391, filed on Aug. 5, 2021, in the Korean Intellectual Property Office, the disclosures of which are incorporated by reference herein in their entireties.

BACKGROUND

Field

The disclosure relates to a method for supporting a wireless charging scheme and a device thereof.

Description of Related Art

Recently, electronic devices (e.g., smart phones, mobile terminals, laptops, tablets, or wearable devices) can provide various functions such as a voice communication function, a short-range wireless communication function, a mobile communication function, a photographing function, a content playback function, and a navigation function.

As utilization is increased and a function is diversified due to the improvement of the performance of electronic devices, a need for battery fast charge or efficient power control in the electronic devices is also increasing. An electronic device providing a wireless charging function can charge a battery through a wireless charging circuit even without a wired connection. For example, as a wireless charging scheme, there are a magnetic induction scheme, a magnetic resonance scheme, or an RF scheme.

The magnetic induction scheme is a wireless charging scheme of wirelessly transmitting power through an induced current that is generated using a magnetic field generated between a coil included in an electronic device and a coil included in a wireless charger.

The magnetic resonance scheme is a wireless charging scheme of wirelessly transmitting power using a magnetic resonance phenomenon that is generated between a coil included in an electronic device and a coil included in a wireless charger.

In an electronic device and a wireless charger supporting all a wireless charging scheme such as a magnetic induction scheme and a magnetic resonance scheme, when the electronic device initiates wireless charging, it is necessary to determine the wireless charging scheme and perform the wireless charging.

In an initial step of performing wireless charging, the wireless charging scheme is determined as one of the magnetic induction scheme or the magnetic resonance scheme. In this case, it may be necessary to change a position of an electronic device in order to increase an efficiency of wireless charging. For example, it may be necessary to change the position of the electronic device in order to change the wireless charging scheme from the magnetic resonance scheme to the magnetic induction scheme during wireless charging execution. Or, it may be necessary to move the position of the electronic device for the sake of more efficient charging while performing charging in the magnetic resonance scheme.

SUMMARY

Embodiments of the disclosure may provide a device and method for selecting a wireless charging scheme of a magnetic induction scheme and a magnetic resonance scheme, based on a charging environment.

According to an example embodiment, a power transmitting unit (PTU) configured to support resonance wireless charging and induction wireless charging may include: a first coil configured for induction wireless charging, a second coil configured for resonance wireless charging, a wireless charging circuit electrically connected to the first coil and the second coil, a short-range wireless communication circuit, and at least one processor operatively connected to the wireless charging circuit and the short-range wireless communication circuit. The at least one processor may be configured to: control the PTU to transmit a first signal for detecting at least one external electronic device through at least one of the first coil and the second coil, receive, through the second coil, a feedback of the transmitted first signal from a first external electronic device among the at least one external electronic device, in response to receiving the feedback, control the wireless charging circuit and transmit a first power for charging the first external electronic device in a resonance scheme, identify whether a first region corresponding to the first coil and being at least partially flat is available, based on the first region being available, determine whether to change a charging scheme of the first external electronic device from the resonance scheme to an induction scheme, and in response to determining to change the charging scheme of the first external electronic device into the induction scheme, transmit a control signal for charging using the induction scheme to the first external electronic device through the short-range wireless communication circuit.

According to an example embodiment, a method of operating a power transmitting unit (PTU) configured to support resonance wireless charging and induction wireless charging may include: transmitting a first signal for detecting at least one external electronic device through at least one of a first coil for the induction wireless charging and a second coil for the resonance wireless charging, receiving, through the second coil, a feedback of the transmitted first signal from a first external electronic device among the at least one external electronic device, in response to receiving the feedback, controlling a wireless charging circuit and transmitting a first power for charging the first external electronic device in a resonance scheme, identifying whether a first region corresponding to the first coil and being at least partially flat is available, based on the first region being available, determining whether to change a charging scheme of the first external electronic device from the resonance scheme to an induction scheme, and in response to determining to change the charging scheme of the first external electronic device into the induction scheme, transmitting a control signal for charging using the induction scheme to the first external electronic device through a short-range wireless communication circuit.

According to an example embodiment, a power transmitting unit (PTU) configured to support resonance wireless charging and induction wireless charging may include: at least one wireless charging coil, a wireless charging circuit electrically connected to the at least one wireless charging coil, a short-range wireless communication circuit, and at least one processor operatively connected to the wireless communication circuit and the short-range wireless communication circuit. The at least one processor may be configured to: transmit a first signal for detecting at least one power receiving unit through the at least one wireless charging coil, receive a feedback of the transmitted first signal from the at least one power receiving unit through the at least one wireless charging coil, in response to receiving the feedback, identify a first power receiving unit configured to support the resonance wireless charging and not supporting the induction wireless charging among the at least one power receiving unit, control the wireless charging circuit and transmit a first power for charging the identified first power receiving unit in a resonance scheme, obtain information on a battery state of charge of the first power receiving unit from the first power receiving unit through the short-range wireless communication circuit, determine whether a charging level of the first power receiving unit is less than or equal to a threshold value, based on the obtained information on the state of charge, and in response to determining that the charging level of the first power receiving unit is less than or equal to the threshold value, transmit a signal instructing a movement of the first power receiving unit through the short-range wireless communication circuit.

According to an example embodiment, a power receiving unit (PRU) configured to support resonance wireless charging and/or induction wireless charging may include: a wireless charging circuit, a short-range wireless communication circuit, a display, and at least one processor operatively connected to the wireless charging circuit, the short-range wireless communication circuit, and the display. The at least one processor may be configured to: receive a first signal for detecting the power receiving unit from a power transmitting unit through the wireless charging circuit, transmit a feedback of the received first signal to the power transmitting unit through the wireless charging circuit, receive a first power for charging in a resonance scheme through the wireless charging circuit, in response to receiving the first power, perform wireless charging in the resonance scheme, while performing the wireless charging in the resonance scheme, transmit information on a battery state of charge of the power receiving unit to the power transmitting unit through the short-distance wireless communication circuit, receive a control signal for charging using an induction scheme from the power transmitting unit through the short-range wireless communication circuit, and in response to receiving the control signal, output a movement guide through the display.

According to various example embodiments of the disclosure, an electronic device that supports all of a wireless charging scheme of a magnetic induction scheme and a magnetic resonance scheme may select a specific scheme and perform wireless charging.

According to various example embodiments of the disclosure, in order to further increase a charging efficiency while performing wireless charging in one of the magnetic induction scheme and the magnetic resonance scheme, an electronic device may change into a charging scheme of a high charging efficiency and perform the wireless charging.

According to various example embodiments of the disclosure, an electronic device may effectively present a location guide to a user by displaying a user interface instructing a movement of the electronic device to more increase a charging efficiency during wireless charging execution of the electronic device.

In addition, various effects directly or indirectly identified through the present disclosure may be presented.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation with a description of the drawings, the same or similar reference numerals may be used for the same or similar components.

DETAILED DESCRIPTION

Various example embodiments of the present disclosure will be described in greater detail below with reference to the accompanying drawings. However, this is not intended to limit the present disclosure to a specific embodiment form, and it should be understood that various modifications, equivalents, and/or alternatives of the embodiment of the present disclosure are included.

Figure 1:
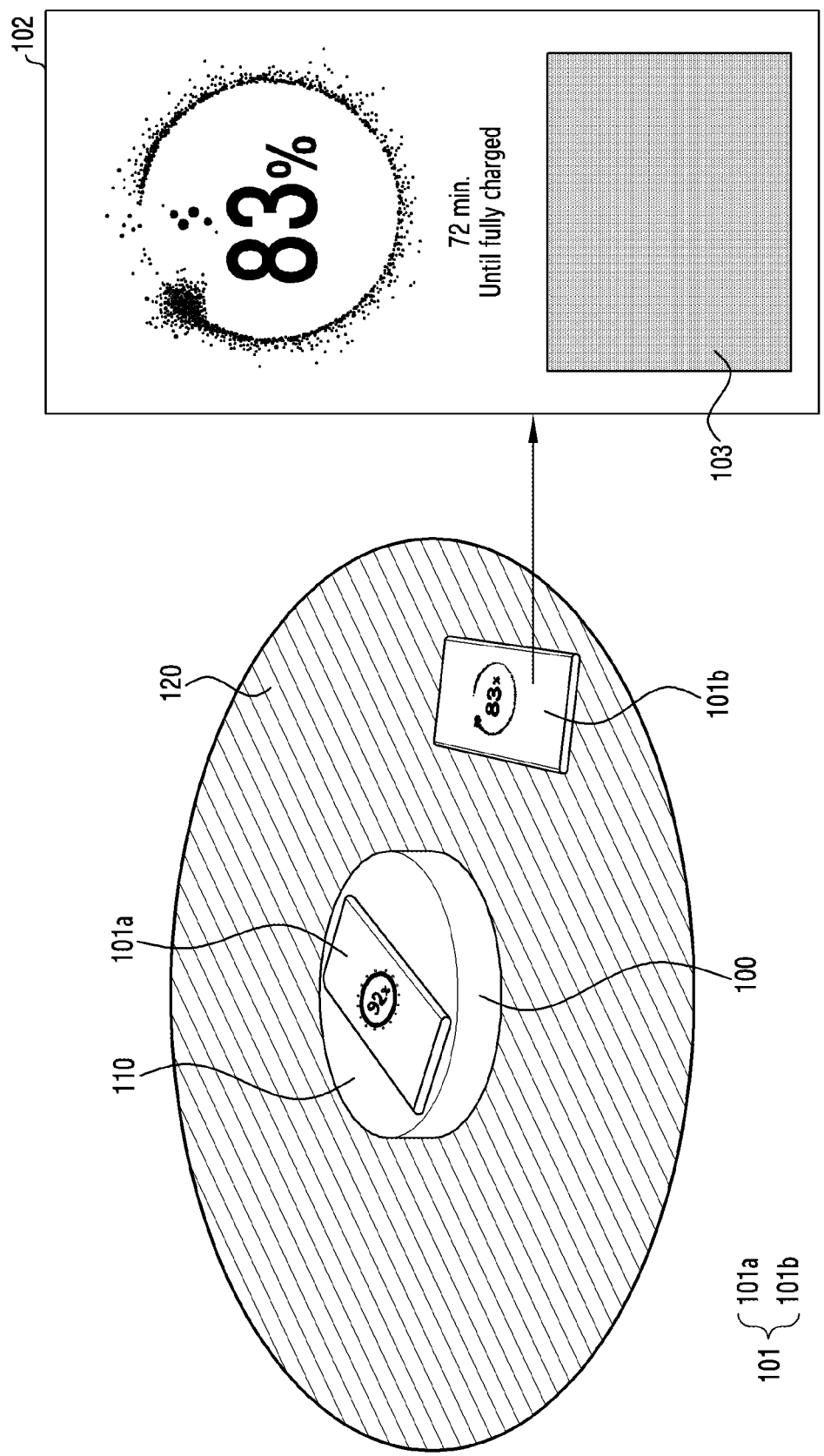
FIG. 1 is a diagram illustrating an electronic device and an external electronic device according to various embodiments.

FIG. 1 is a diagram illustrating an electronic device and an external electronic device according to various embodiments.

Referring to FIG. 1, according to an embodiment, the external electronic device 101 (e.g., a first external electronic device 101a and a second external electronic device 101b) may be an electronic device that supports a wireless charging scheme of a magnetic induction scheme and/or a magnetic resonance scheme. For example, the external electronic device 101 may refer, for example, to a smart phone, a tablet PC, or a smart watch. However, the external electronic device is not limited to the above-described example and may include an electronic device that supports the wireless charging scheme of the magnetic induction scheme and/or the magnetic resonance scheme.

According to an embodiment, the electronic device 100 may be a power transmitting unit (PTU) that supports a wireless charging scheme of a magnetic induction scheme and/or a magnetic resonance scheme. For example, the electronic device 100 may refer to a pad-type wireless charger or a cylindrical or space-type wireless charger that supports the wireless charging scheme of the magnetic induction scheme and/or the magnetic resonance scheme.

According to an embodiment, a wireless power transfer (WPT) technology may refer, for example, to a technology for converting an electrical energy into an electromagnetic wave form and wirelessly forwarding energy to a load without a transmission line, and may include a wireless charging scheme of a magnetic induction scheme and a magnetic resonance scheme.

According to an embodiment, the wireless charging scheme of the magnetic induction scheme is a scheme of forwarding power using a magnetic field induced in a coil, and may refer, for example, to a scheme of supplying energy to a load by flowing an induced current in a receiving coil using a magnetic field provided from a current flowing in a transmitting coil. Since the magnetic induction scheme is a tightly coupling scheme, a charging efficiency may be higher than that of the magnetic resonance scheme. In various embodiments disclosed herein, a coil used for wireless charging of the magnetic induction scheme may be referred to as an induction coil.

According to an embodiment, the wireless charging scheme of the magnetic resonance scheme may refer to a scheme of supplying energy using a magnetic resonance phenomenon between coils. According to an embodiment, when wireless charging of the magnetic resonance scheme is performed, since the magnetic resonance scheme is a loosely coupled scheme, the wireless charging may be performed until a distance between the coils is several tens of centimeters (cm). In various embodiments, a coil used for the wireless charging of the magnetic resonance scheme may be referred to as a resonance coil.

According to an embodiment, the external electronic device 101 may be in contact with a first region 110 of the electronic device 100 and perform wireless charging using a magnetic induction scheme. For example, the first external electronic device 101a located in the first region 110 of the electronic device 100 may perform wireless charging using the magnetic induction scheme while being in contact with the electronic device 100.

According to an embodiment, the external electronic device 101 may perform the wireless charging using the magnetic resonance scheme in a state in which it is located in a second region 120 without contacting with the first region 110 of the electronic device 100. For example, the second external electronic device 101b located in the second region 120 may perform wireless charging using the magnetic resonance scheme in a state in which it is not in contact with a top of a wireless charging pad.

According to an embodiment, the external electronic device 101 may output information on a state of charge through a display 102. For example, the information on the state of charge may include at least one of a charging speed, a wireless charging scheme, fast charge or not, and a charging level. According to an embodiment, the external electronic device 101 may present a location guide through a first region 103 of the display 102. For example, the location guide may refer to a guide instructing a movement of the external electronic device 101. According to the above-described embodiment, the external electronic device 101 may visually present a guide that increases a charging efficiency by displaying the location guide on the display 102.

Figure 2:
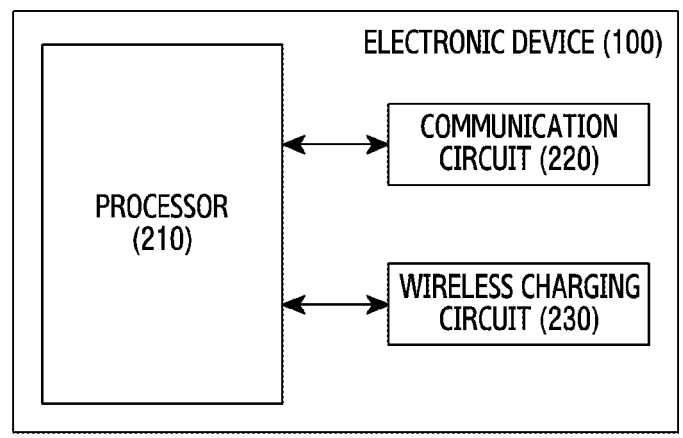
FIG. 2 is a block diagram illustrating an example configuration of an electronic device according to various embodiments.

FIG. 2 is a block diagram illustrating an example configuration of an electronic device according to various embodiments.

Referring to FIG. 2, the electronic device 100 may include a processor (e.g., including processing circuitry) 210, a communication circuit 220, and a wireless charging circuit 230. In various embodiments, the electronic device 100 may include additional components in addition to the components illustrated in FIG. 2, or may omit at least one of the components illustrated in FIG. 2.

According to an embodiment, the processor 210 may include various processing circuitry and execute instructions stored in a memory (not shown) and control operations of the components (e.g., the communication circuit 220 and the wireless charging circuit 230) of the electronic device 100. According to an embodiment, the processor 210 may be operatively and/or electrically connected to the communication circuit 220 and the wireless charging circuit 230. According to an embodiment, the processor 210 may execute software and control at least one other component (e.g., the communication circuit 220 and the wireless charging circuit 230) connected to the processor 210. According to an embodiment, the processor 210 may obtain a command from the components included in the electronic device 100, and may interpret the obtained command, and may process and/or compute various data according to the interpreted command.

According to an embodiment, the communication circuit 220 may support communication performance of the electronic device 100 (e.g., a wireless charger) using wired communication or wireless communication (e.g., Bluetooth (BT), Bluetooth low energy (BLE), Wi-Fi, and NFC). For example, the electronic device 100 may perform communication with the external electronic device 101 through the communication circuit 220 using a frequency that is the same as or adjacent to a frequency used for wireless power transmission. According to an embodiment, the processor 210 may obtain information on a battery state of charge of an external electronic device from the external electronic device (e.g., the external electronic device 101 of FIG. 1) through the communication circuit 220. According to an embodiment, the processor 210 may request the information on the battery state of charge of the external electronic device 101 through the communication circuit 220. According to an embodiment, the processor 210 may receive information on a current battery charging level from the external electronic device 101 through the communication circuit 220. According to an embodiment, when it is determined that the current charging level is less than or equal to a threshold value, based on the information on the current charging level obtained from the external electronic device 101 through the communication circuit 220, the processor 210 may determine to change a charging scheme from a resonance scheme to an induction scheme.

According to an embodiment, the wireless charging circuit 230 may perform wireless charging using a magnetic field provided through a coil. For example, the electronic device 100 may perform wireless charging of a magnetic induction scheme or magnetic resonance scheme through the wireless charging circuit 230.

Figure 3:
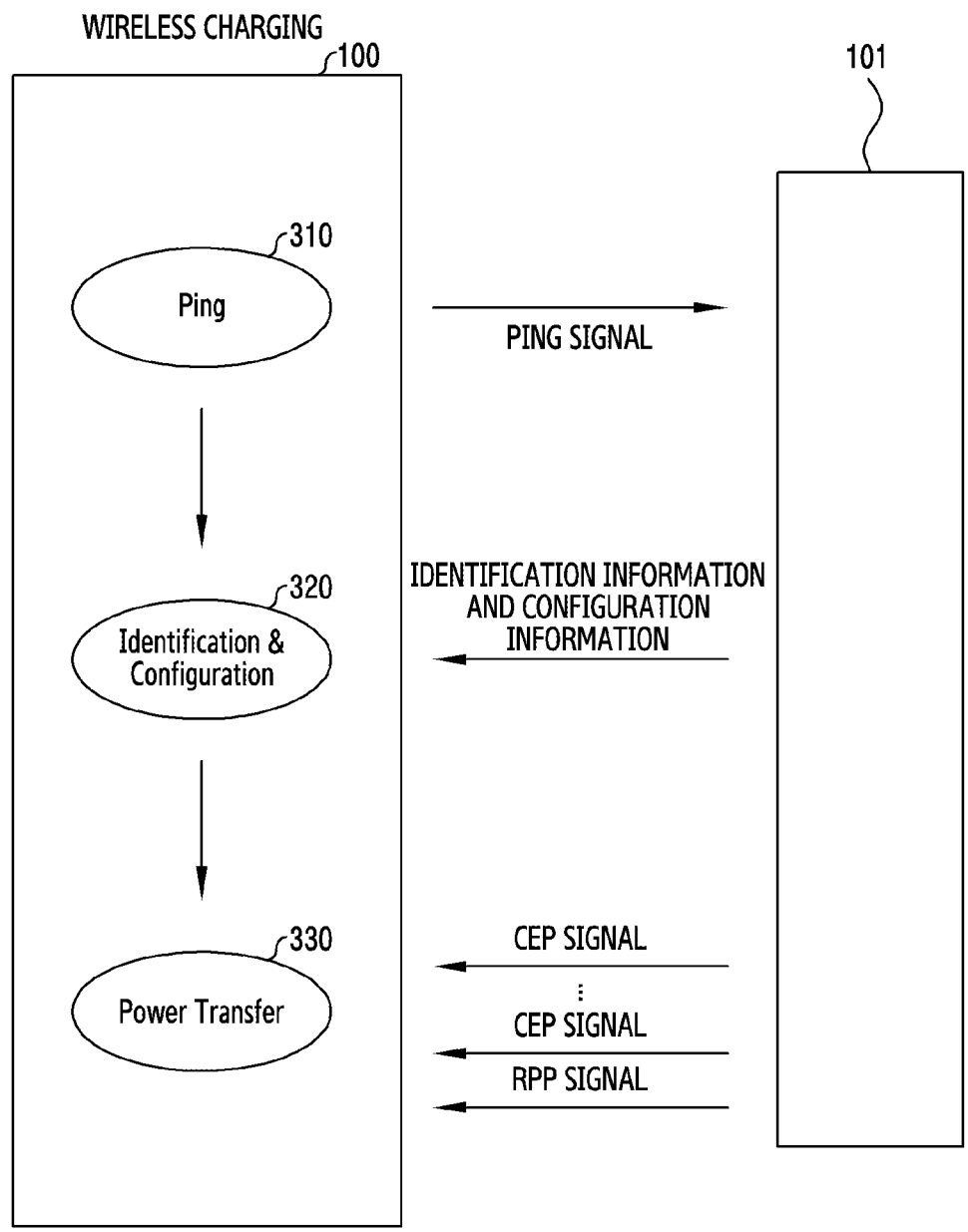
FIG. 3 is a diagram illustrating an example of a signal transmitted/received between an electronic device and an external electronic device at wireless charging according to various embodiments.

FIG. 3 is a diagram illustrating an example of a signal transmitted/received between the electronic device 100 and the external electronic device 101 at wireless charging according to various embodiments.

Referring to FIG. 3, the electronic device 100 may transmit/receive and output at least one signal corresponding to a ping phase 310, an authentication phase (identification and configuration) 320 and/or a power transfer phase 330 in order to detect and authenticate the external electronic device 101 and present power to the external electronic device 101.

According to an embodiment, the electronic device 100 may transmit a ping signal (e.g., a digital ping signal or an analog ping signal) in the ping phase 310. According to an embodiment, as the external electronic device 101 receives the ping signal from the electronic device 100, the electronic device 100 may detect the external electronic device 101.

According to an embodiment, as the external electronic device 101 is detected, the electronic device 100 may receive identification information and configuration information for authenticating a power receiving unit from the external electronic device 101 in the authentication phase 320. Also, for example, the identification information may include information for identifying the external electronic device 101, and the configuration information may include various types of information necessary for the external electronic device 101 to receive power.

According to an embodiment, the electronic device 100 may authenticate the external electronic device 101, based on the identification information and configuration information from the external electronic device 101, and as the authentication succeeds, the electronic device 100 may receive power information from the external electronic device 101 in the power transfer phase 330.

According to an embodiment, while the external electronic device 101 performs wireless charging from the electronic device 100, the external electronic device 101 may transmit a signal corresponding to power information to the electronic device 100. For example, the signal corresponding to the power information may include a control error packet (CEP) signal and a received power packet (RPP) signal. According to an embodiment, while the external electronic device 101 performs the wireless charging from the electronic device 100, the electronic device 100 may receive data (e.g., a control error packet (CEP)) or received power packet (RPP) signal) corresponding to at least one or more pieces of power information. For example, the control error packet (CEP) signal may include information indicating an amplitude of transmission power transmitted from the electronic device 100 or a request for change of the transmission power, and the received power packet (RPP) signal may include information indicating an amplitude of reception power received by the external electronic device 101.

Figure 4A:
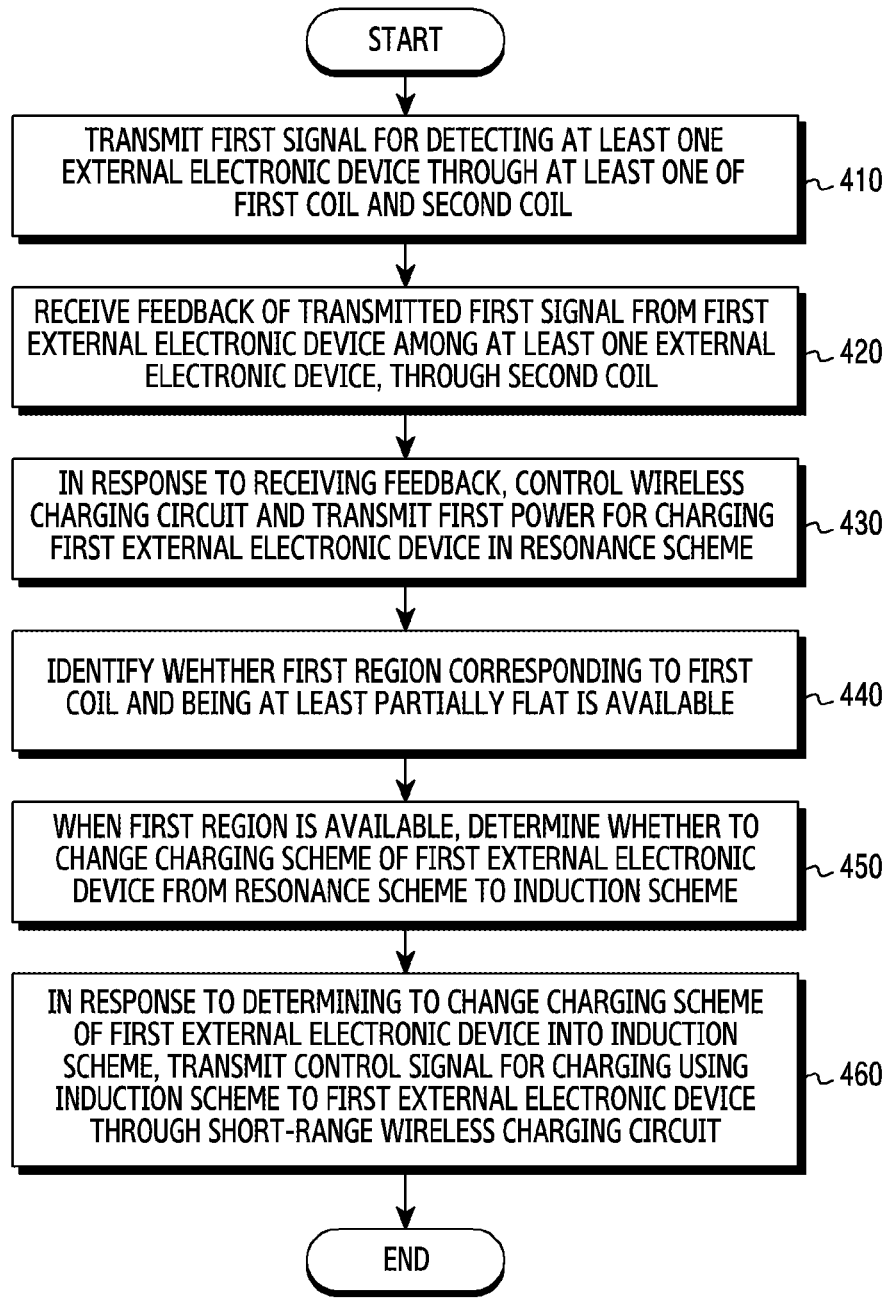
FIG. 4A is a flowchart illustrating an example operation in which an electronic device transmits a signal instructing a change of a wireless charging scheme to an external electronic device according to various embodiments.

FIG. 4A is a flowchart illustrating an example operation in which an electronic device transmits a signal instructing a change of a wireless charging scheme to an external electronic device according to various embodiments.

Referring to FIG. 4A, in operation 410, the electronic device 100 of an embodiment may transmit a first signal for detecting at least one external electronic device 101 through at least one of a first coil (e.g., an induction coil) and a second coil (e.g., a resonance coil). For example, the first signal may include a ping signal, and hereinafter, the first signal may be referred to as a ping signal or a ping power in the present disclosure. According to an embodiment, the electronic device 100 may transmit the first signal for detecting the external electronic device 101 using at least one of the first coil (e.g., the induction coil) used for induction wireless charging and the second coil (e.g., the resonance coil) used for resonance wireless charging.

According to an embodiment, in operation 420, the electronic device 100 may receive a feedback of the transmitted first signal (e.g., the ping signal) from a first external electronic device among at least one external electronic device through the second coil (e.g., the resonance coil). According to an embodiment, the first external electronic device may transmit a feedback including that power for induction and/or resonance wireless charging has been received through short-range wireless communication (e.g., Bluetooth (BT), Bluetooth low energy (BLE), and ultra-wideband (UWB)), based on identifying a frequency corresponding to the power received from the electronic device 100, and the electronic device 100 may receive the feedback through the coil for wireless charging.

According to an embodiment, in operation 430, in response to receiving the feedback, the electronic device 100 may control a wireless charging circuit and transmit first power for charging the first external electronic device in the resonance scheme. According to an embodiment, in response to receiving the feedback including that the first external electronic device is an electronic device that supports the resonance scheme, the electronic device 100 may supply power for charging in the resonance scheme to the first external electronic device.

According to an embodiment, in operation 440, the electronic device 100 may identify whether a first region corresponding to a first coil (e.g., an induction coil) and being at least partially flat is available. According to an embodiment, the electronic device 100 may correspond to a pad type wireless charger that supports the wireless charging scheme or a cylindrical type wireless charger that supports the wireless charging scheme, but is not limited thereto. According to an embodiment, the first region may be a region that is included in a housing of the electronic device 100 and is at least partially flat.

According to an embodiment, the electronic device 100 may determine whether the first region corresponding to the first coil (e.g., the induction coil) is available. For example, when the first region is empty, when an object not supporting wireless charging is disposed in the first region, or when it is determined that a battery of the electronic device disposed in the first region is in a fully charged state, the electronic device 100 may determine that the first region is available.

According to an embodiment, in operation 450, when the first region is available, the electronic device 100 may determine whether to change the charging scheme of the first external electronic device from the resonance scheme to the induction scheme. According to an embodiment, when the first region is empty, when the object not supporting the wireless charging is disposed in the first region, or when it is determined that the battery of the electronic device disposed in the first region is in the fully charged state, the electronic device 100 may identify whether to change the charging scheme of the first external electronic device from the resonance scheme to the induction scheme.

According to an embodiment, in operation 460, in response to determining to change the charging scheme of the first external electronic device into the induction scheme, the electronic device 100 may transmit a control signal for charging using the induction scheme to the first external electronic device through a short-range wireless communication circuit. For example, when it is determined that a charging level of the first external electronic device is less than or equal to a threshold value, the electronic device 100 may transmit a signal indicating that charging using the induction scheme is possible, to the first external electronic device.

As described above, by transmitting a signal instructing a change of the charging scheme to at least one external electronic device, the electronic device may contribute to increasing a charging efficiency of the external electronic device.

Figure 4B:
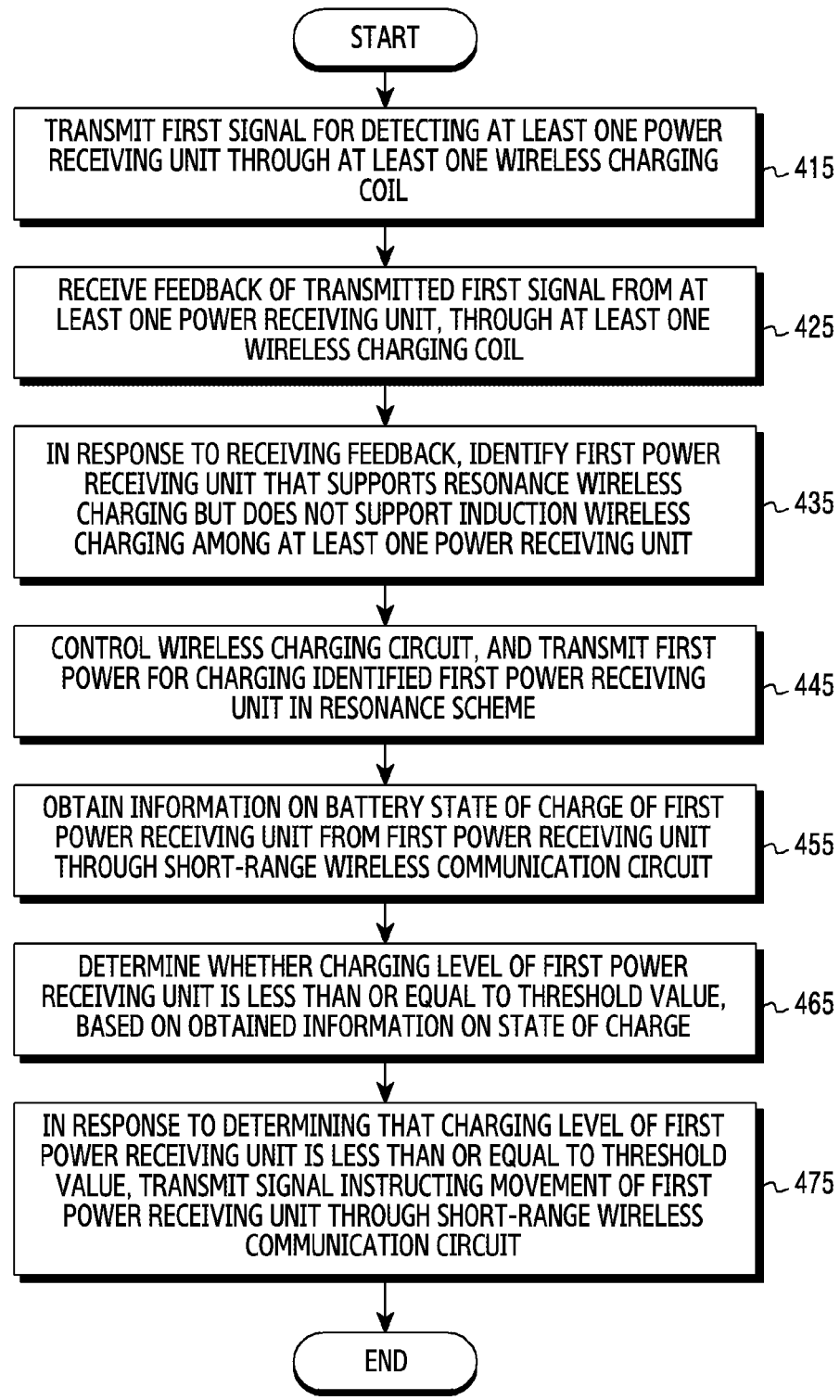
FIG. 4B is a flowchart illustrating an example operation in which an electronic device transmits a signal instructing a movement to an external electronic device according to various embodiments.

FIG. 4B is a flowchart illustrating an example operation in which the electronic device 100 transmits a signal instructing a movement to the external electronic device 101 according to various embodiments. Contents overlapping with or similar to those described above in relation to FIG. 4B may be simplified or may not be repeated here.

Referring to FIG. 4B, in operation 415, the electronic device 100 may transmit a first signal for detecting at least one power receiving unit through at least one wireless charging coil. According to an embodiment, the electronic device 100 may transmit the first signal (e.g., a ping signal) for detecting the external electronic device 101 using at least one of a first coil (e.g., an induction coil) used for induction wireless charging and a second coil (e.g., a resonance coil) used for resonance wireless charging.

According to an embodiment, in operation 425, the electronic device 100 may receive a feedback of the transmitted first signal from at least one power receiving unit through at least one wireless charging coil. According to an embodiment, the electronic device 100 may receive, through the wireless charging coil, a feedback received through a short-range wireless communication circuit.

According to an embodiment, in operation 435, in response to receiving the feedback, the electronic device 100 may identify a first power receiving unit that supports resonance wireless charging but does not support induction wireless charging among at least one power receiving unit. According to an embodiment, the electronic device 100 may identify the first power receiving unit having received a power for the resonance wireless charging among the at least one power receiving unit.

According to an embodiment, in operation 445, the electronic device 100 may control a wireless charging circuit and transmit a first power for charging the identified first power receiving unit in the resonance scheme.

According to an embodiment, in operation 455, the electronic device 100 may obtain information on a battery state of charge (e.g., a battery charging level) of the first power receiving unit from the first power receiving unit through the short-range wireless communication circuit. According to an embodiment, the electronic device 100 may request the information on the battery state of charge to the first power receiving unit through the short-range wireless communication circuit. According to an embodiment, the electronic device 100 may receive information on a current battery charging level from the first power receiving unit through the short-range wireless communication circuit.

According to an embodiment, in operation 465, the electronic device 100 may determine whether the charging level of the first power receiving unit is less than or equal to a threshold value, based on the obtained information on the state of charge. According to an embodiment, the electronic device 100 may determine whether the current charging level is less than or equal to the threshold value, based on the information on the current charging level obtained from the first power receiving unit.

According to an embodiment, in operation 475, in response to determining that the charging level of the first power receiving unit is less than or equal to the threshold value, the electronic device 100 may transmit a signal instructing a movement of the first power receiving unit through the short-range wireless communication circuit. According to an embodiment, when it is determined that the current charging level of the first power receiving unit is less than or equal to the threshold value, the electronic device 100 may transmit a signal for guiding to move the first power receiving unit to the first power receiving unit.

As described above, by transmitting a signal instructing a movement to at least one power receiving unit, the electronic device may contribute to increasing a charging efficiency of the power receiving unit.

Figure 5:
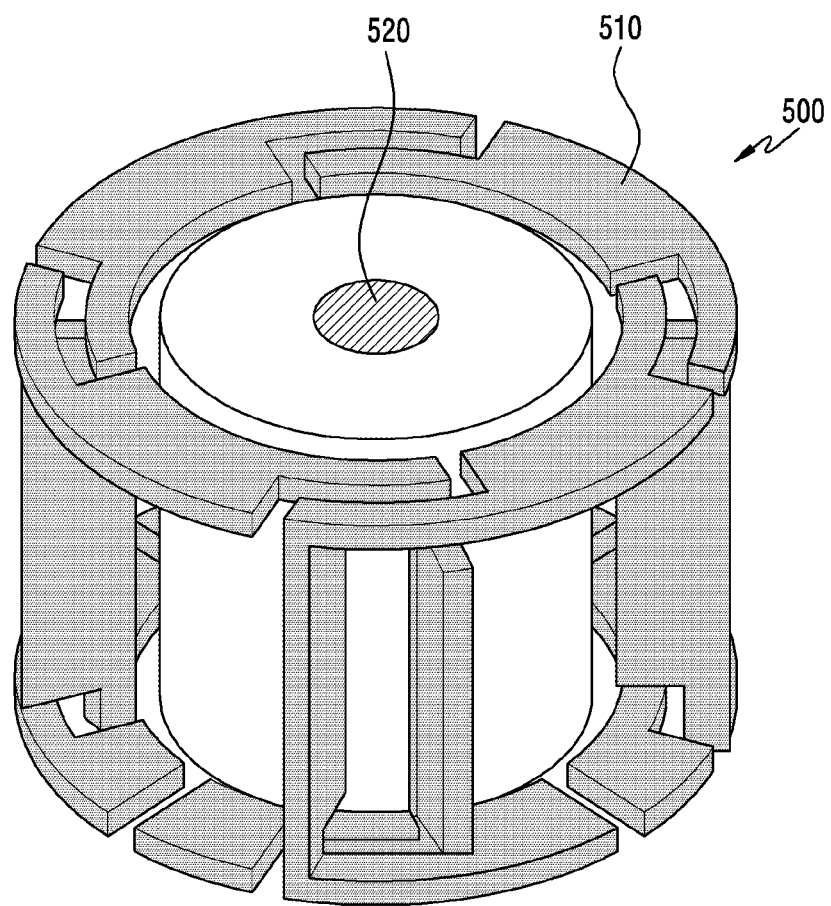
FIG. 5 is a diagram illustrating at least one coil included in an electronic device according to various embodiments.

FIG. 5 is a diagram illustrating at least one coil included in an electronic device according to various embodiments.

Referring to FIG. 5, a power transmitting unit 500 (e.g., the electronic device 100 of FIG. 1) may include at least one resonance coil 510 used for wireless charging of a magnetic resonance scheme and an induction coil 520 used for wireless charging of a magnetic induction scheme. The wireless charging scheme of the magnetic resonance scheme may refer to a scheme of supplying energy using a magnetic resonance phenomenon between the resonance coils 510. The wireless charging scheme of the magnetic induction scheme may refer to a scheme of supplying energy to a load by flowing an induced current in a receiving coil using a magnetic field provided from a current flowing in the induction coil 520.

According to an embodiment, the resonance coil 510 and/or the induction coil 520 may be connected to a power amplifier (PA) in which selective power supply is possible, respectively, and may be disposed two or more outside the power transmitting unit 500. As the number of coils for wireless charging increases, chargeable coverage and selective power supply capability may be improved.

According to an embodiment, the resonance coil 510 and/or the induction coil 520 may transmit a ping power. According to an embodiment, according as locations of the coils are changed when a position of an external electronic device performing wireless charging is changed, the power transmitting unit 500 may continuously supply a power.

Figure 6A:
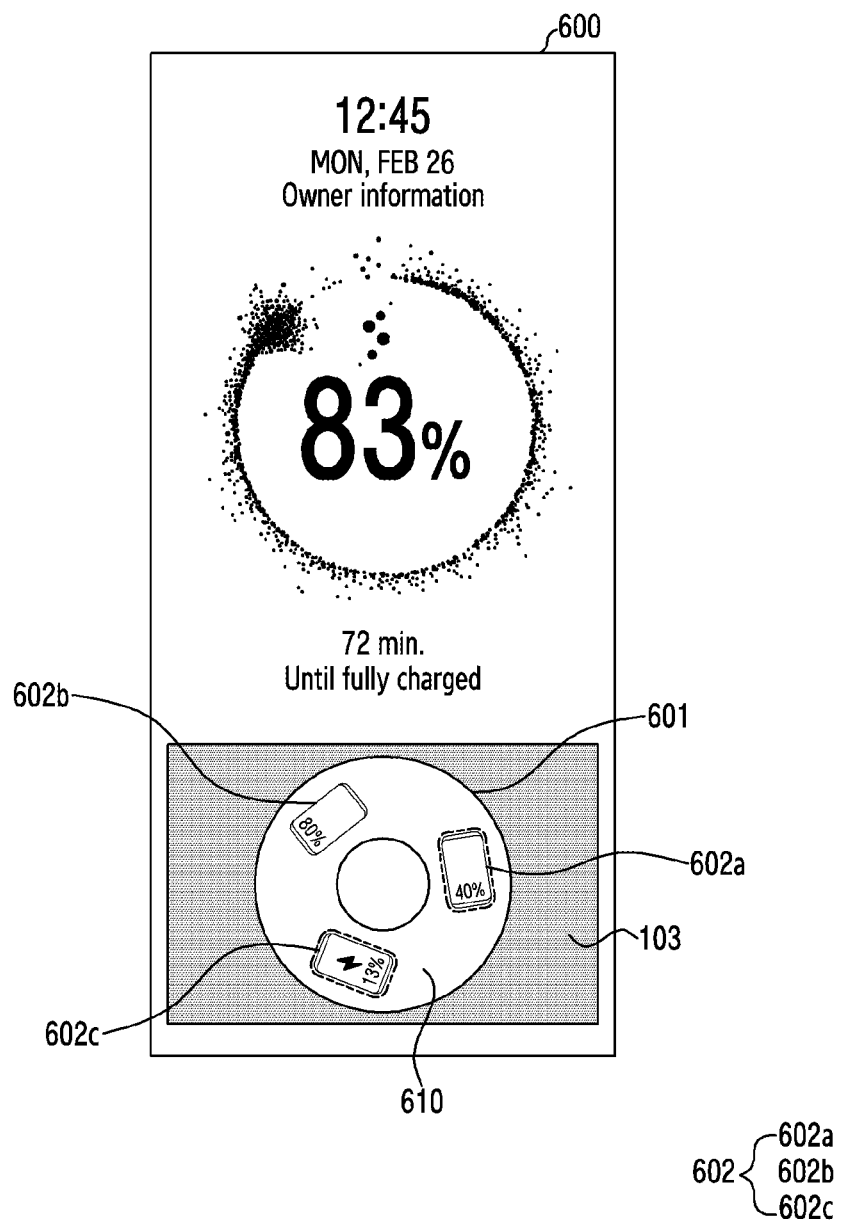
FIGS. 6A and 6B are diagrams illustrating an example of presenting a location guide to a user to change a wireless charging scheme of at least one power receiving unit in an external electronic device according to various embodiments.
Figure 6B:
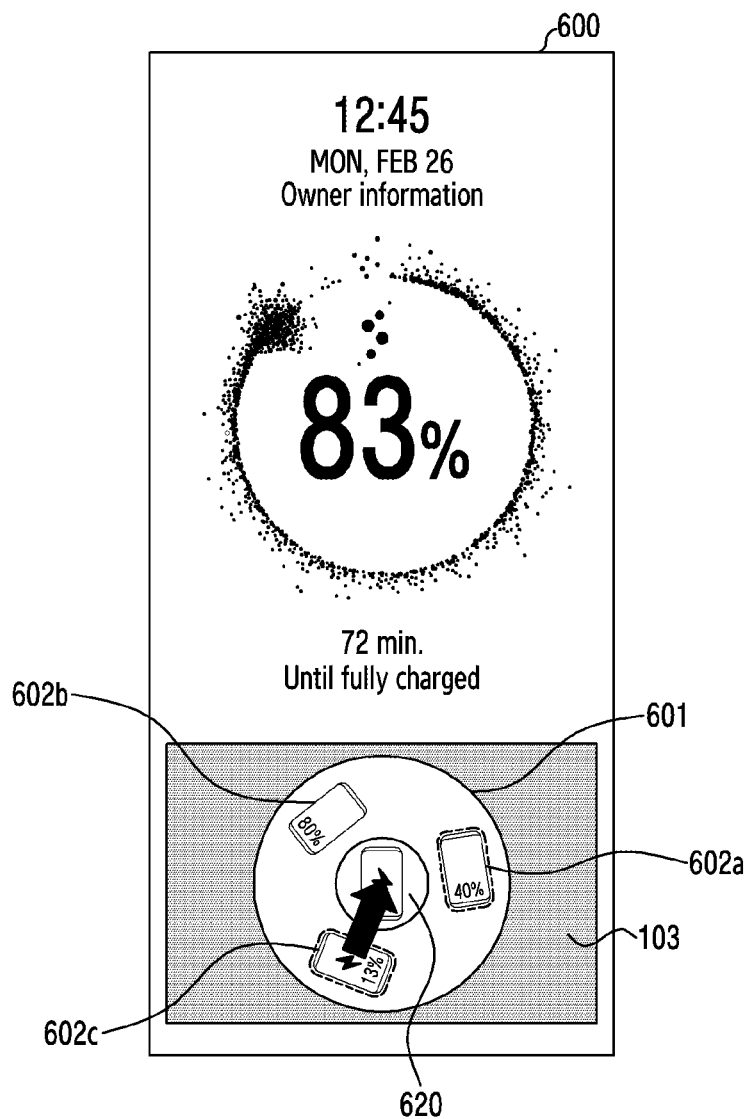

FIGS. 6A and 6B are diagrams illustrating an example of presenting a location guide to a user to change a wireless charging scheme of at least one power receiving unit in an external electronic device according to various embodiments.

Referring to FIG. 6A, the external electronic device (e.g., the external electronic device 101 of FIG. 1) may display information on a battery state of charge through a display 600. According to an embodiment, the external electronic device 101 may overlap and display a user interface (UI) 601 for a power transmitting unit and a UI 602 for peripheral at least one external electronic device in the first region 103 that is at least a partial region of the display 600. For example, the at least one external electronic device may refer to an external electronic device that supports all resonance wireless charging and induction wireless charging. Also, for example, the UI 602 for the at least one external electronic device may include a first UI 602a for a first external electronic device, a second UI 602b for a second external electronic device, and a third UI 602c for a third external electronic device.

According to an embodiment, when the first external electronic device, the second external electronic device, and the third external electronic device are located in a resonance charging region 610, the first UI, the second UI, and the third UI may be displayed to correspond to locations of the first external electronic device, the second external electronic device, and the third external electronic device in the resonance charging region 610, respectively.

Referring to FIG. 6B, the external electronic device 101 may display a UI for guiding at least one of a first external electronic device, a second external electronic device, and a second external electronic device to move to an induction charging region 620, based on receiving a control signal for charging in an induction scheme from a power transmitting unit. For example, when it is determined that the third external electronic device has the smallest charging level among the first external electronic device, the second external electronic device, and the third external electronic device, the external electronic device 101 may present a guide for moving the third external electronic device to the induction charging region 620 through the display 600. For example, the guide may include displaying an arrow pointing to the induction charging region 620 in the third UI 602c.

Figure 7:
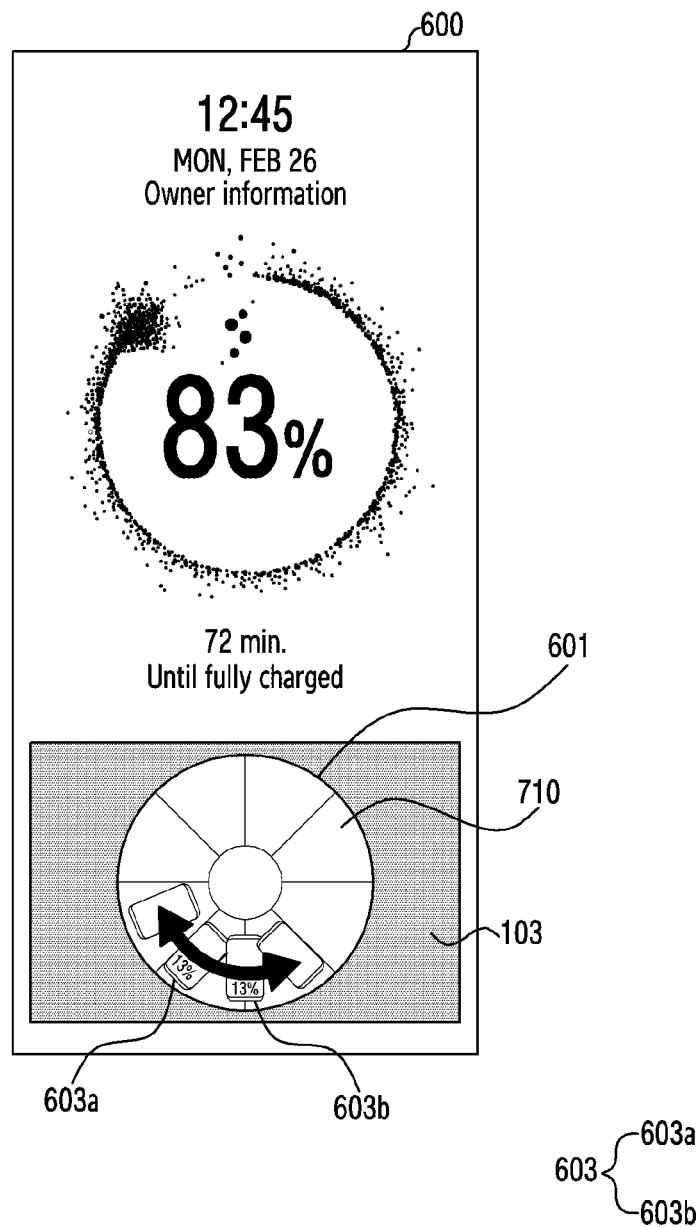
FIG. 7 is a diagram illustrating an example of presenting a location guide to a user to move at least one power receiving unit in an external electronic device according to various embodiments.

FIG. 7 is a diagram illustrating an example location guide to a user to move at least one power receiving unit in an external electronic device according to various embodiments.

Referring to FIG. 7, the external electronic device (e.g., the external electronic device 101 of FIG. 1) may display information on a battery state of charge through a display 600. According to an embodiment, the external electronic device 101 may overlap and display a UI 601 for a power transmitting unit and a UI 603 for peripheral at least one external electronic device in the first region 103 that is at least a partial region of the display 600. For example, the at least one external electronic device may refer, for example, to an external electronic device that supports resonance wireless charging but does not support induction wireless charging. Also, for example, the UI 603 for the at least one external electronic device may include a first UI 603a for a first external electronic device and a second UI 603b for a second external electronic device.

According to an embodiment, the external electronic device 101 may display a UI of guiding to move at least one of the first external electronic device and the second external electronic device, based on receiving a signal instructing a movement of the at least one external electronic device from the power transmitting unit. According to an embodiment, when a charging efficiency of a resonance scheme for the at least one external electronic device is less than or equal to a threshold value, the external electronic device 101 may receive a signal instructing a movement of the at least one external electronic device from the power transmitting unit (e.g., the electronic device 100 of FIG. 1).

According to an embodiment, when it is determined that a distance between the first external electronic device and the second external electronic device is less than a threshold value or when the number of external electronic devices corresponding to each one resonance coil region is two or more, the external electronic device 101 may present a guide for moving the at least one external electronic device through the display 600. For example, the guide may include a guide for allowing the distance between the first external electronic device and the second external electronic device to be greater than or equal to the threshold value or a guide for allowing only one external electronic device to be disposed in each one resonance coil region.

Figure 8:
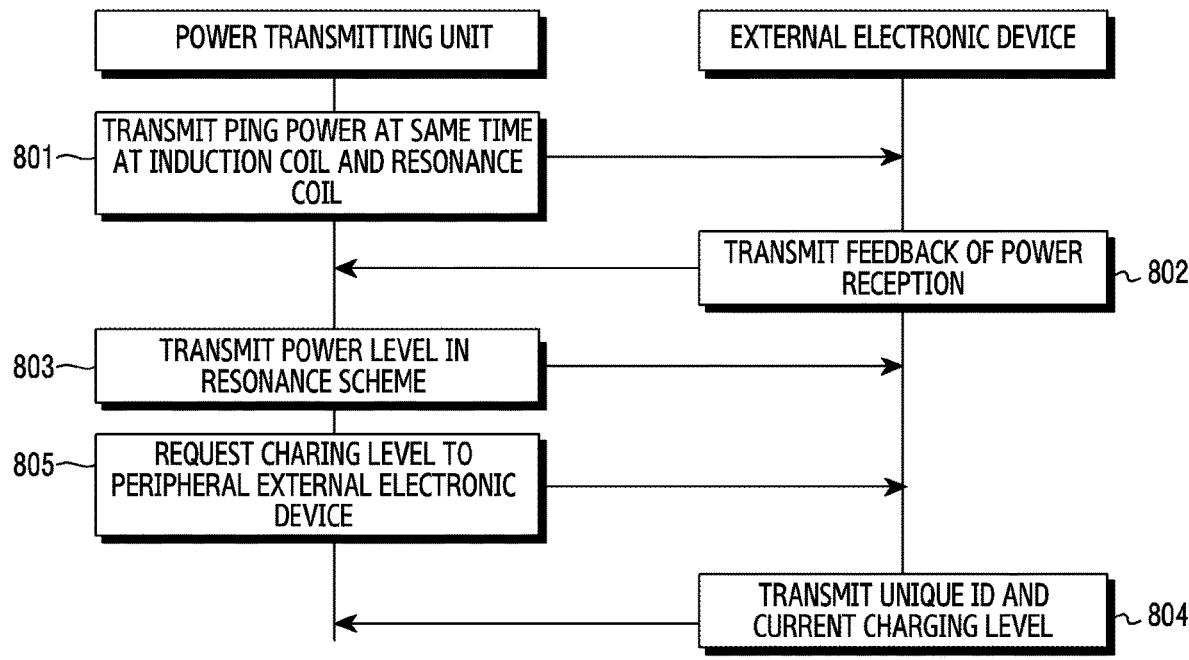
FIG. 8 is a signal flow diagram illustrating an example signal transmitted/received between an electronic device and an external electronic device according to various embodiments.

FIG. 8 is a signal flow diagram illustrating an example of a signal transmitted/received between an electronic device and an external electronic device according to various embodiments. Referring to FIG. 8, in operation 801, a power transmitting unit (e.g., the electronic device 100 of FIG. 1) of an embodiment may transmit a ping power to an external electronic device (e.g., the external electronic device 101 of FIG. 1) at the same time at an induction coil and a resonance coil.

According to an embodiment, in operation 802, as the external electronic device receives the ping power from the power transmitting unit, the external electronic device may transmit a feedback to the power transmitting unit. According to an embodiment, the external electronic device may identify a frequency corresponding to the received power through, for example, an RX chip. According to an embodiment, the external electronic device may determine whether it has received a power corresponding to which scheme among an induction scheme and/or a resonance scheme, based on a band of the identified frequency.

According to an embodiment, the external electronic device may transmit the feedback to the power transmitting unit according to determining whether it has received the power corresponding to which scheme. For example, the external electronic device may transmit a feedback indicating that a power corresponding to the resonance scheme is received, to the power transmitting unit.

According to an embodiment, in response to receiving the ping power from the power transmitting unit, the external electronic device may perform charging. According to an embodiment, the external electronic device may perform wireless charging in a charging scheme corresponding to the identified frequency band. For example, in response to identifying a frequency corresponding to the resonance scheme, the external electronic device may perform the wireless charging in the resonance scheme.

According to an embodiment, in operation 803, the power transmitting unit may transmit a power amount to the external electronic device in the resonance scheme. According to an embodiment, as receiving the feedback including that the power corresponding to the resonance scheme is received from the external electronic device through a wireless charging coil, the power transmitting unit may supply the power corresponding to the resonance scheme to the external electronic device.

According to an embodiment, in operation 805, the power transmitting unit may request information on a battery state of charge (SOC), to a peripheral external electronic device. For example, the power transmitting unit may request information on a current charging level for each device, to peripheral at least one external electronic device.

According to an embodiment, in operation 804, the external electronic device may transmit a unique identification (ID) and/or information on a current state of charge to the power transmitting unit. According to an embodiment, as receiving a request for information on a battery state of charge from the power transmitting unit, the external electronic device may transmit a unique ID and information on the current charging level to the power transmitting unit.

Figure 9A:
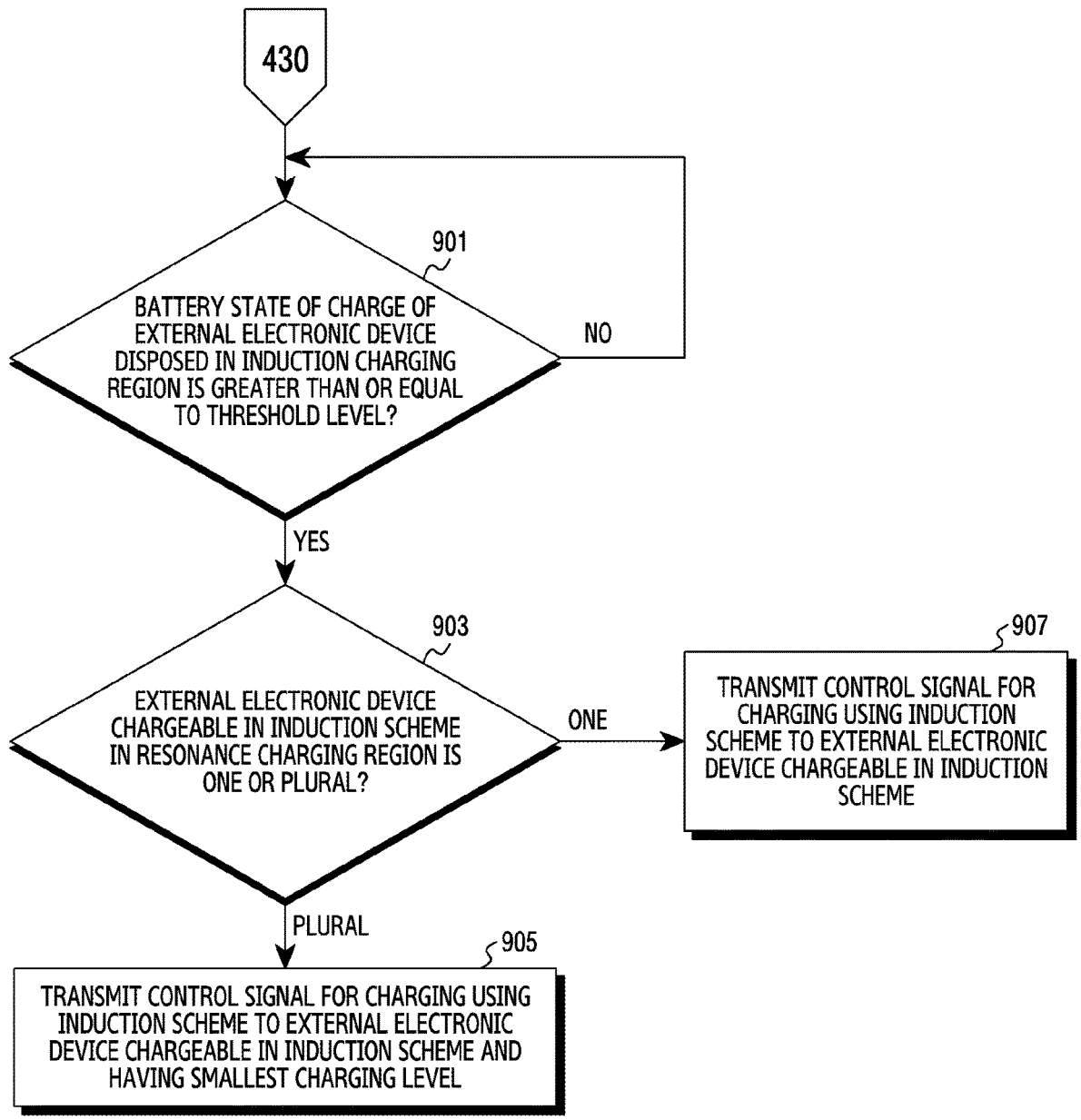
FIG. 9A is a flowchart illustrating example transmission of a signal instructing a change of a wireless charging scheme to an external electronic device that supports an induction scheme and a resonance scheme in an electronic device according to various embodiments.

FIG. 9A is a flowchart illustrating an example operation of transmitting a signal instructing a change of a wireless charging scheme to the external electronic device 101 that supports an induction scheme and a resonance scheme in the electronic device 100 according to various embodiments.

Referring to FIG. 9A, after controlling the wireless charging circuit and transmitting the first power for charging the first external electronic device in the resonance scheme in operation 430 of FIG. 4A, in operation 901, when the external electronic device is disposed in an induction charging region, the electronic device 100 may determine whether a battery state of charge of the external electronic device disposed in the induction charging region is greater than or equal to a threshold level.

According to an embodiment, when it is determined that the battery state of charge of the external electronic device disposed in the induction charging region is less than the threshold level, the electronic device 100 may return to operation 430 and control the wireless charging circuit and may transmit the first power for charging the first external electronic device in the resonance scheme.

According to an embodiment, when it is determined that the battery state of charge of the external electronic device disposed in the induction charging region is greater than or equal to the threshold level, in operation 903, the electronic device 100 may check (or identify) whether an external electronic device being chargeable in an induction scheme in a resonance charging region is one or plural in number. For example, where it is determined that the battery state of charge of the external electronic device disposed in the induction charging region is greater than or equal to the threshold level may include where a battery of the external electronic device disposed in the induction charging region is in a fully charged state.

According to an embodiment, when it is determined that there is one external electronic device being chargeable in the induction scheme in the resonance charging region, in operation 907, the electronic device 100 may transmit a control signal for charging using the induction scheme to the external electronic device being chargeable in the induction scheme.

According to an embodiment, when it is determined that there are a plurality of external electronic devices being chargeable in the induction scheme in the resonance charging region, in operation 905, the electronic device 100 may transmit a control signal for charging using the induction scheme to the external electronic device being chargeable in the induction scheme and having the smallest charging level.

Figure 9B:
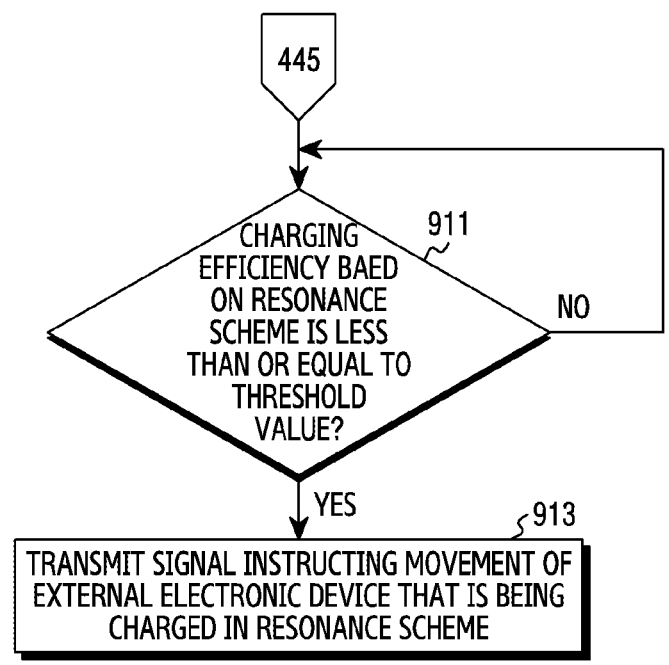
FIG. 9B is a flowchart illustrating example transmission of a signal instructing to move to an external electronic device that supports a resonance scheme but does not support an induction scheme in an electronic device according to various embodiments.

FIG. 9B is a flowchart illustrating an example operation of transmission of a signal instructing to move to an external electronic device that supports a resonance scheme but does not support an induction scheme in the electronic device 100 according to various embodiments.

Referring to FIG. 9B, after controlling the wireless charging circuit and transmitting the power for charging the external electronic device (e.g., a power receiving unit) in the resonance scheme in operation 445 of FIG. 4B, in operation 911, the electronic device 100 may determine whether a charging efficiency being based on the resonance scheme is less than or equal to a threshold value.

For example, while an external electronic device that supports resonance wireless charging but does not support induction wireless charging performs wireless charging in the resonance scheme, the power transmitting unit may determine whether the charging efficiency is less than or equal to a threshold value (e.g., 50%). For example, where a resonance charging efficiency is less than or equal to a threshold value may include at least one of where the external electronic device is disposed outside a charging region, where the number of external electronic devices corresponding to each one resonance coil region is two or more, and where a distance between RX chips of the external electronic devices is less than a threshold value.

According to an embodiment, when it is not determined that the charging efficiency being based on the resonance scheme is less than or equal to the threshold value, the electronic device 100 may return to operation 445 and control the wireless charging circuit and transmit a power for charging the external electronic device in the resonance scheme.

According to an embodiment, when it is determined that the charging efficiency being based on the resonance scheme is less than or equal to the threshold value, in operation 913, the electronic device 100 may transmit a signal instructing a movement to the external electronic device that is performing charging in the resonance scheme. According to an embodiment, when it is determined that the charging efficiency being based on the resonance scheme is less than or equal to the threshold value, the electronic device 100 may transmit a signal for guiding a movement to the external electronic device in order to increase the charging efficiency.

Figure 9C:
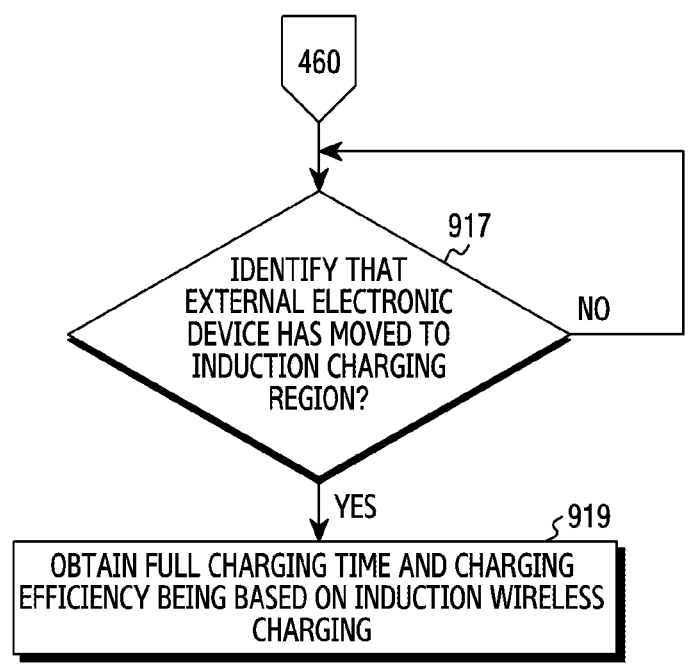
FIG. 9C is a flowchart illustrating example recalculating a full charging time and a charging efficiency when it is identified that a wireless charging scheme of an external electronic device that supports an induction scheme and a resonance scheme has been changed in an electronic device according to various embodiments.

FIG. 9C is a flowchart illustrating an example operation of an external electronic device that supports an induction scheme and a resonance scheme recalculating a full charging time and a charging efficiency when it is identified that a wireless charging scheme has been changed, in an electronic device according to various embodiments.

Referring to FIG. 9C, after transmitting the control signal for charging using the induction scheme to the external electronic device (e.g., a first external electronic device) in operation 460 of FIG. 4A, in operation 917, the electronic device 100 of an embodiment may identify whether the external electronic device has moved to an induction charging region. For example, the electronic device 100 may identify whether the external electronic device has moved to the induction charging region, based on a signal received from the external electronic device through a short-range wireless communication circuit.

According to an embodiment, when it is not identified that the external electronic device has moved to the induction charging region, the electronic device 100 may return to operation 460 and transmit a control signal for charging using the induction scheme to the external electronic device.

According to an embodiment, when it is identified that the external electronic device has moved to the induction charging region, in operation 919, the electronic device 100 may obtain a full charging time and a charging efficiency being based on the induction wireless charging. According to an embodiment, when the charging scheme of the external electronic device is changed from the resonance scheme to the induction scheme after the external electronic device moves to the induction charging region, the electronic device 100 may obtain (or calculate) a full charging time and a charging efficiency being based on the induction wireless charging.

According to an embodiment, the electronic device 100 may monitor a charging current value in a charging IC of the external electronic device, and determine whether it is fast charge or slow charge according to the charging current value. For example, when the monitored charging current value is within a range of 1.5 A to 2 A, the electronic device 100 may determine that it is a fast charge situation, and when the monitored charging current value is 0.5 A or less, the electronic device 100 may determine that it is a slow charge situation.

According to an embodiment, the electronic device 100 may determine (or calculate) the charging efficiency and/or the full charging time of the external electronic device, based on the result of monitoring the charging current value.

Figure 9D:
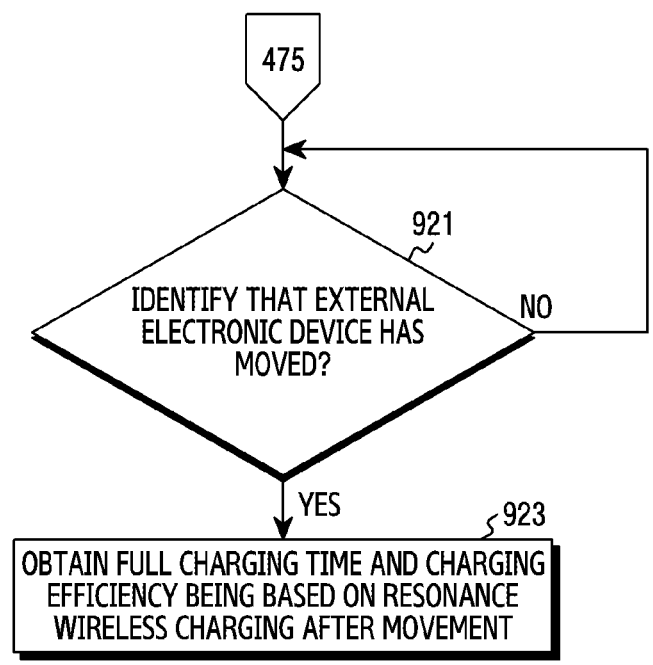
FIG. 9D is a flowchart illustrating example recalculating a full charging time and a charging efficiency when it is identified that an external electronic device that supports a resonance scheme but does not support an induction scheme has been moved in an electronic device according to various embodiments.

FIG. 9D is a flowchart illustrating an example operation of recalculation of a full charging time and a charging efficiency when it is identified that an external electronic device that supports a resonance scheme but does not support an induction scheme has moved, in an electronic device according to various embodiments.

Referring to FIG. 9D, after transmitting the signal instructing the movement to the external electronic device (e.g., a first power receiving unit) in operation 475 of FIG. 4B, in operation 921, the electronic device 100 may identify whether the external electronic device has moved. For example, the electronic device 100 may identify whether the external electronic device has moved, based on a signal received from the external electronic device through a short-range wireless communication circuit.

According to an embodiment, when it is not identified that the external electronic device has moved according to the signal, the electronic device 100 may return to operation 475 and transmit a signal instructing a movement to the external electronic device.

According to an embodiment, when it is identified that the external electronic device has moved according to the signal, in operation 923, the electronic device 100 may obtain a full charging time and a charging efficiency being based on resonance wireless charging after the movement.

According to an embodiment, the electronic device 100 may recalculate the charging efficiency and/or the full charging time of the external electronic device, based on a result of monitoring a charging current value in the charging IC of the external electronic device.

Figure 10:
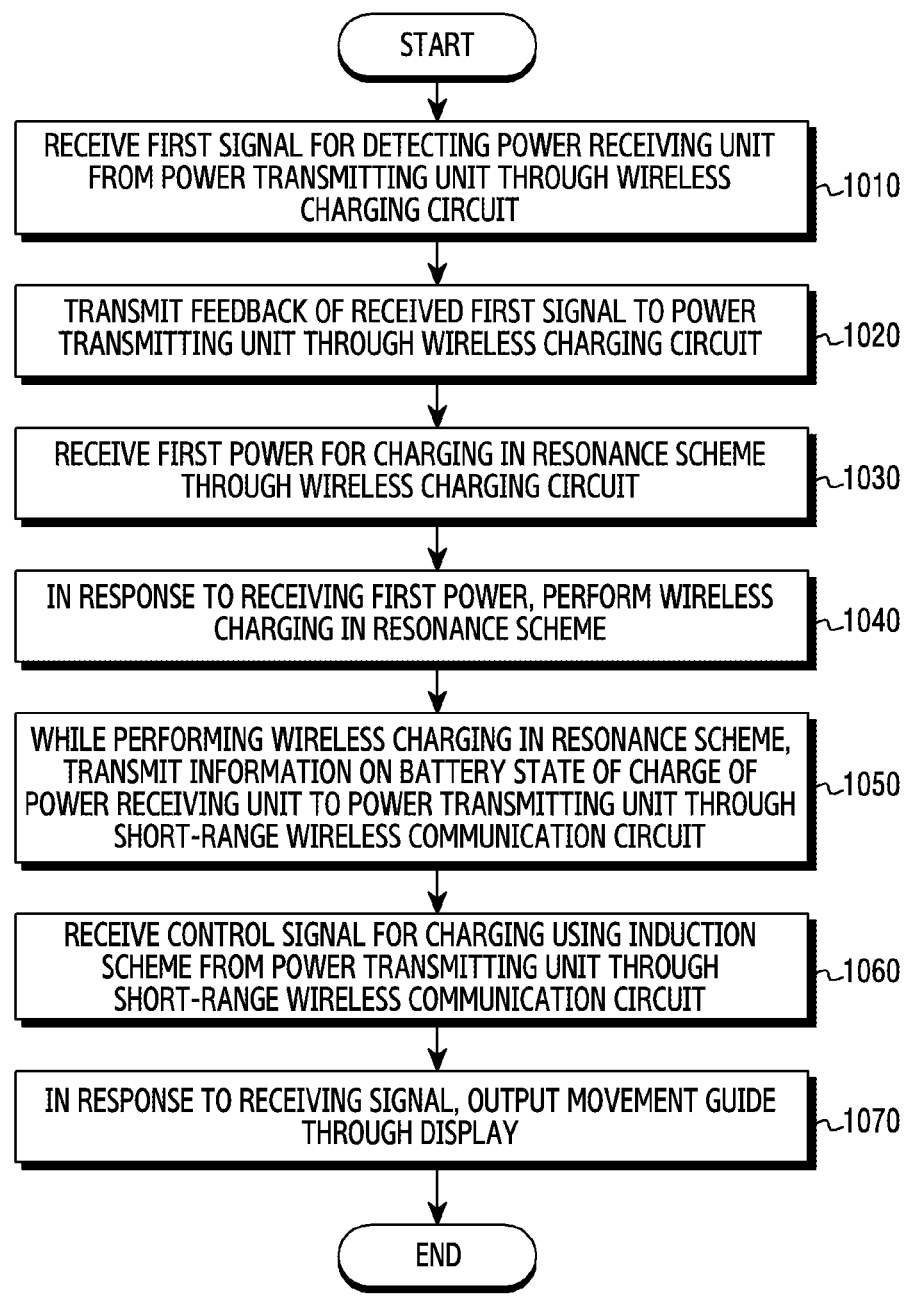
FIG. 10 is a flowchart illustrating an example operation of a power receiving unit that supports wireless charging according to various embodiments.

FIG. 10 is a flowchart illustrating an example operation of a power receiving unit that supports wireless charging according to various embodiments.

Referring to FIG. 10, in operation 1010, the power receiving unit (e.g., the external electronic device 101 of FIG. 1) may receive a first signal for detecting the power receiving unit from a power transmitting unit through a wireless charging circuit.

According to an embodiment, in operation 1020, the power receiving unit may transmit a feedback of the received first signal to the power transmitting unit through the wireless charging circuit. According to an embodiment, the power receiving unit may transmit a feedback including that power for resonance wireless charging has been received through the wireless charging circuit, based on the identifying of a frequency corresponding to the signal received from the power transmitting unit.

According to an embodiment, in operation 1030, the power receiving unit may receive a first power for charging in a resonance scheme through the wireless charging circuit.

According to an embodiment, in operation 1040, in response to receiving the first power, the power receiving unit may perform wireless charging in the resonance scheme. According to an embodiment, the wireless charging circuit of the power receiving unit may perform wireless charging using a magnetic field provided through a coil. For example, the power receiving unit may perform wireless charging of a magnetic resonance scheme through the wireless charging circuit.

According to an embodiment, in operation 1050, while performing the wireless charging in the resonance scheme, the power receiving unit may transmit information on a battery state of charge of the power receiving unit to the power transmitting unit through the short-range wireless communication circuit. According to an embodiment, in response to receiving a request for information on the battery state of charge from the power transmitting unit, the power receiving unit may transmit a unique ID and information on a current charging level through the short-range wireless communication.

According to an embodiment, in operation 1060, the power receiving unit may receive a control signal for charging using an induction scheme from the power transmitting unit through the short-range wireless communication circuit. For example, the control signal for charging using the induction scheme may include a signal for guiding a movement to a region for charging in the induction scheme or a signal indicating that charging is possible using the induction scheme.

According to an embodiment, in operation 1070, in response to receiving the signal, the power receiving unit may output a movement guide through a display. For example, the movement guide may include a UI for guiding a movement from a region in which wireless charging is performed in the resonance scheme to a region in which wireless charging is performed in the induction scheme. According to an embodiment, the guide presented through the display may be accompanied by at least one of a voice guidance or sound through a speaker, a vibration through a motor, and LED blinking.

Figure 11A:
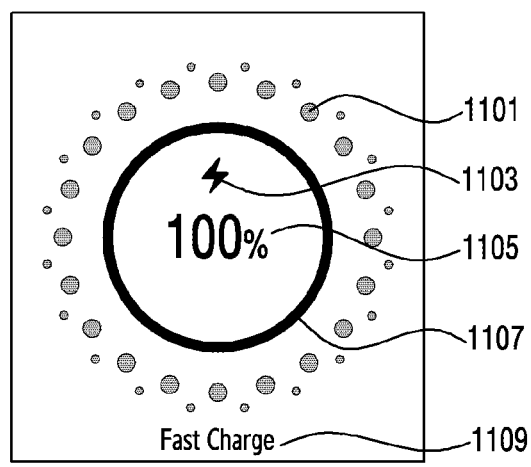
FIG. 11A is a diagram illustrating an example of displaying a state of charge while performing wireless charging in an induction scheme in an external electronic device according to various embodiments.
Figure 11B:
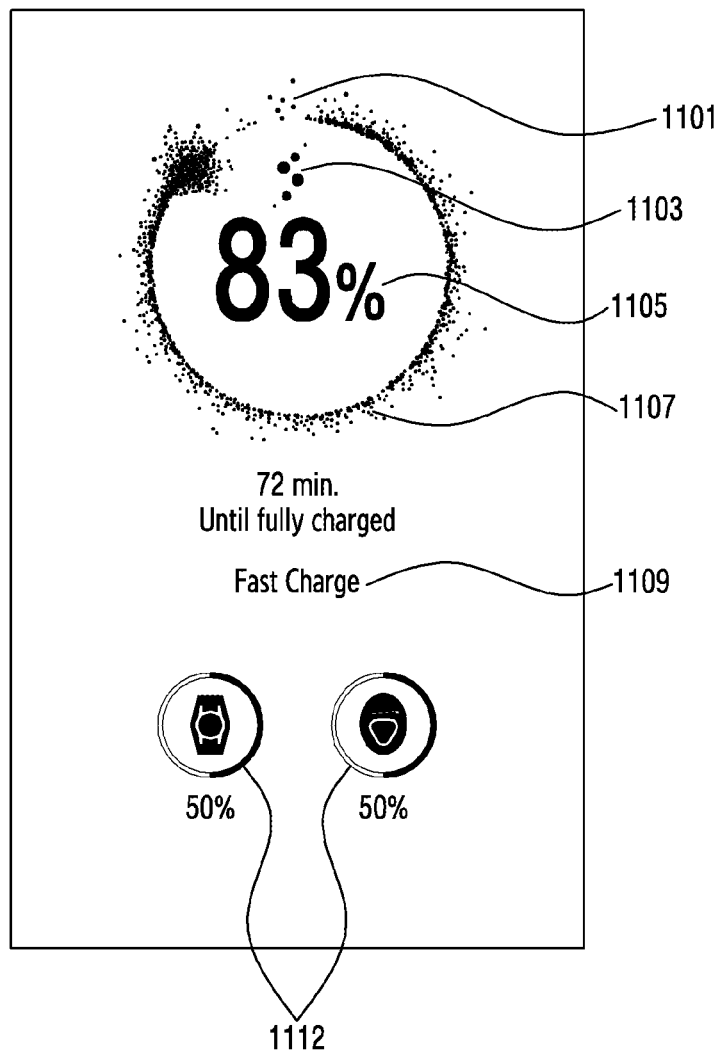
FIG. 11B is a diagram illustrating an example of displaying a state of charge while performing wireless charging in a resonance scheme in an external electronic device according to various embodiments.

FIG. 11A is a diagram illustrating an example of displaying a state of charge while performing wireless charging in an induction scheme in an external electronic device according to various embodiments. FIG. 11B is a diagram illustrating an example of displaying a state of charge while performing wireless charging in a resonance scheme in an external electronic device according to various embodiments.

Referring to FIG. 11A and FIG. 11B, the external electronic device (e.g., the external electronic device 101 of FIG. 1) of an embodiment may present information on a state of charge through a display (e.g., the display 600 of FIG. 6). According to an embodiment, the external electronic device 101 may display, through the display 600, a first UI 1101 indicating a charging speed, a second UI 1103 indicating the type of a wireless charging scheme, a third UI 1105 indicating a current charging level, a fourth UI 1107 indicating a charging speed and/or a charging level, and a fifth UI 1109 indicating fast charge or not.

According to an embodiment, a particle size of the first UI 1101 indicating the charging speed may change according to the charging speed. For example, the faster the charging speed is, the larger the particle size may be displayed.

According to an embodiment, the second UI 1103 indicating the type of the wireless charging scheme may display a text and/or icon differently according to a wireless charging scheme. For example, an icon when the external electronic device is being charged in an induction scheme and an icon when the external electronic device is being charged in a resonance scheme may be displayed differently.

According to an embodiment, the third UI 1105 indicating the current charging level may display the current charging level by a text. For example, when it is determined that a current state of charge is greater than or equal to a threshold level, 100% indicating a fully charged state may be displayed.

According to an embodiment, the fourth UI 1107 indicating the charging speed and/or the charging level may display a thickness of distribution of particles differently according to the charging speed. For example, the faster the charging speed is, the thicker the thickness of distribution of particles may be displayed. Or, for example, the larger the current charging level is, the thicker the thickness of particle distribution may be displayed.

According to an embodiment, the fifth UI 1109 indicating fast charge or not may vary according to the charging current value. For example, when the charging current value is within a range of 1.5 A to 2 A, the fifth UI 1109 may display a text and/or icon indicating the fast charge, and when the monitored charging current value is less than or equal to 0.5 A, the fifth UI 1109 may display a text and/or icon indicating slow charge.

Referring to FIG. 11B, when there are a plurality of external electronic devices that are being wirelessly charged according to an embodiment, a sixth UI 1112 displaying states of charge of the plurality of external electronic devices may be displayed. For example, when a first external electronic device and a second external electronic device are being wirelessly charged, each current charging level may be displayed together with each electronic device.

According to various example embodiments, a power transmitting unit (PTU) (e.g., the electronic device 100 of FIG. 1 or the electronic device 100 of FIG. 2) configured to support resonance wireless charging and induction wireless charging may include: a first coil for induction wireless charging, a second coil for resonance wireless charging, a wireless charging circuit (e.g., the wireless charging circuit 230 of FIG. 2) electrically connected to the first coil and the second coil, a short-range wireless communication circuit (e.g., the communication circuit 220 of FIG. 2), and at least one processor (e.g., the processor 210 of FIG. 2) operatively connected to the wireless charging circuit and the short-range wireless communication circuit. The at least one processor may be configured to: control the power transmitting unit to transmit a first signal for detecting at least one external electronic device through at least one of the first coil and the second coil, receive, through the second coil, a feedback of the transmitted first signal from a first external electronic device among the at least one external electronic device, in response to receiving the feedback, control the wireless charging circuit and transmit a first power for charging the first external electronic device in a resonance scheme, identify whether a first region (e.g., the first region 110 of FIG. 1) corresponding to the first coil and being at least partially flat is available, based on the first region being available, determine whether to change a charging scheme of the first external electronic device from the resonance scheme to an induction scheme, and in response to determining to change the charging scheme of the first external electronic device into the induction scheme, transmit a control signal for charging using the induction scheme to the first external electronic device through the short-range wireless communication circuit.

According to an example embodiment, based on identifying that a second external electronic device among the at least one external electronic device is located in the first region, the at least one processor may be configured to check a battery state of charge (SOC) of the second external electronic device, and in response to identifying that the battery state of charge of the second external electronic device is greater than or equal to a threshold level, transmit the control signal for charging using the induction scheme to the first external electronic device.

According to an example embodiment, the at least one processor may be configured to obtain first information on a battery state of charge of the first external electronic device from the first external electronic device through the short-range wireless communication circuit, and based on identifying, based on the first information, that a battery charging level of the first external electronic device is less than or equal to a threshold value, determine whether to change the charging scheme of the first external electronic device from the resonance scheme to the induction scheme.

According to an example embodiment, the at least one processor may be configured to obtain first information on a battery state of charge of the first external electronic device from the first external electronic device through the short-range wireless communication circuit, and obtain second information on a battery state of charge of a second external electronic device from the second external electronic device among the at least one external electronic device, and based on determining, based on the first information and the second information, that the battery charging level of the first external electronic device is lower than a battery charging level of the second external electronic device, determine to change the charging scheme of the first external electronic device from the resonance scheme to the induction scheme.

According to an example embodiment, the at least one processor may be configured to obtain a signal including a unique identification (ID) from the first external electronic device through the short-range wireless communication circuit, the short-range wireless communication circuit being configured for communication using at least one of Bluetooth (BT), Bluetooth low energy (BLE) and ultra-wideband (UWB), and identify whether the first external electronic device supports all the resonance scheme and the induction scheme, based on the obtained signal.

According to an example embodiment, the at least one processor may be configured to obtain a first full charging time and a first charging efficiency while the first external electronic device is charged in the resonance scheme, and based on transmitting the control signal to the first external electronic device, based on the charging scheme of the first external electronic device being changed from the resonance scheme to the induction scheme, obtain a second full charging time and a second charging efficiency that are based on the induction wireless charging.

According to an example embodiment, a method of operating a power transmitting unit (PTU) (e.g., the electronic device 100 of FIG. 1 or the electronic device 100 of FIG. 2) configured to support resonance wireless charging and induction wireless charging may include: transmitting a first signal for detecting at least one external electronic device through at least one of a first coil for the induction wireless charging and a second coil for the resonance wireless charging, receiving, through the second coil, a feedback of the transmitted first signal from a first external electronic device among the at least one external electronic device, in response to receiving the feedback, controlling a wireless charging circuit (e.g., the wireless charging circuit 230 of FIG. 2) and transmitting a first power for charging the first external electronic device in a resonance scheme, identifying whether a first region (e.g., the first region 110 of FIG. 1) corresponding to the first coil and being at least partially flat is available, based on the first region being available, determining whether to change a charging scheme of the first external electronic device from the resonance scheme to an induction scheme, and in response to determining to change the charging scheme of the first external electronic device into the induction scheme, transmitting a control signal for charging using the induction scheme to the first external electronic device through a short-range wireless communication circuit (e.g., the communication circuit 220 of FIG. 2).

According to an example embodiment, the method of operating the power transmitting unit (e.g., the electronic device 100 of FIG. 1 or the electronic device 100 of FIG. 2) may include, based on identifying that a second external electronic device among the at least one external electronic device is located in the first region, checking a battery state of charge of the second external electronic device, and in response to checking that the battery state of charge of the second external electronic device is greater than or equal to a threshold level, transmitting the control signal for charging using the induction scheme to the first external electronic device.

According to an example embodiment, the method of operating the power transmitting unit (e.g., the electronic device 100 of FIG. 1 or the electronic device 100 of FIG. 2) may include obtaining first information on a battery state of charge of the first external electronic device from the first external electronic device through the short-range wireless communication circuit, and based on determining, based on the first information, that a battery charging level of the first external electronic device is less than or equal to a threshold value, determining whether to change the charging scheme of the first external electronic device from the resonance scheme to the induction scheme.

According to an example embodiment, the method of operating the power transmitting unit (e.g., the electronic device 100 of FIG. 1 or the electronic device 100 of FIG. 2) may include obtaining first information on a battery state of charge of the first external electronic device from the first external electronic device through the short-range wireless communication circuit, and obtaining second information on a battery state of charge of a second external electronic device from the second external electronic device among the at least one external electronic device through the short-range wireless communication circuit, and based on determining, based on the first information and the second information, that the battery charging level of the first external electronic device is lower than a battery charging level of the second external electronic device, determining to change the charging scheme of the first external electronic device from the resonance scheme to the induction scheme.

According to an example embodiment, the method of operating the power transmitting unit (e.g., the electronic device 100 of FIG. 1 or the electronic device 100 of FIG. 2) may include obtaining a signal including a unique identification (ID) from the first external electronic device through the short-range wireless communication circuit, the short-range wireless communication circuit being configured for communication using at least one of BT, BLE, and UWB, and identifying whether the first external electronic device supports all the resonance scheme and the induction scheme, based on the obtained signal.

According to an example embodiment, the method of operating the power transmitting unit (e.g., the electronic device 100 of FIG. 1 or the electronic device 100 of FIG. 2) may include obtaining a first full charging time and a first charging efficiency while the first external electronic device is charged in the resonance scheme, and based on transmitting the control signal to the first external electronic device, based on the charging scheme of the first external electronic device being changed from the resonance scheme to the induction scheme, obtaining a second full charging time and a second charging efficiency that are based on the induction wireless charging.

According to an example embodiment, a power transmitting unit (PTU) (e.g., the electronic device 100 of FIG. 1 or the electronic device 100 of FIG. 2) configured to support resonance wireless charging and induction wireless charging may include: at least one wireless charging coil, a wireless charging circuit (e.g., the wireless charging circuit 230 of FIG. 2) electrically connected to the at least one wireless charging coil, a short-range wireless communication circuit (e.g., the communication circuit 220 of FIG. 2), and at least one processor (e.g., the processor 210 of FIG. 2) operatively connected to the wireless communication circuit and the short-range wireless communication circuit. The at least one processor may be configured to: transmit a first signal for detecting at least one power receiving unit through the at least one wireless charging coil, receive a feedback of the transmitted first signal from the at least one power receiving unit through the at least one wireless charging coil, in response to receiving the feedback, identify a first power receiving unit supporting the resonance wireless charging and not supporting the induction wireless charging among the at least one power receiving unit, control the wireless charging circuit and transmit a first power for charging the identified first power receiving unit in a resonance scheme, obtain information on a battery state of charge of the first power receiving unit from the first power receiving unit through the short-range wireless communication circuit, determine whether a charging level of the first power receiving unit is less than or equal to a threshold value, based on the obtained information on the state of charge, and in response to determining that the charging level of the first power receiving unit is less than or equal to the threshold value, transmit a signal instructing a movement of the first power receiving unit through the short-range wireless communication circuit.

According to an example embodiment, based on determining that the first power receiving unit is located outside a resonance charging region, the at least one processor may be configured to transmit the signal instructing the movement of the first power receiving unit.

According to an example embodiment, based on determining that two or more power receiving units including the first power receiving unit are located in a region corresponding to one coil for transmitting a power for the resonance wireless charging among the at least one wireless charging coil, the at least one processor may be configured to transmit the signal instructing the movement of the first power receiving unit.

According to an example embodiment, based on determining that a distance between the first power receiving unit and the second power receiving unit among the at least one power receiving unit is less than or equal to a threshold value, the at least one processor may be configured to transmit the signal instructing the movement of the first power receiving unit.

According to an example embodiment, the at least one processor may be configured to obtain a signal including a unique identification (ID) from the first power receiving unit through the short-range wireless communication circuit, the short-range wireless communication circuit being configured for communication using at least one of BT, BLE, and UWB, and identify whether the first power receiving unit supports the resonance scheme, based on the obtained signal.

According to an example embodiment, the at least one processor may be configured to obtain a first full charging time and a first charging efficiency while the first power receiving unit is charged in the resonance scheme before moving, and in response to receiving a signal indicating that the first power receiving unit moves, obtain a second full charging time and a second charging efficiency while the first power receiving unit is charged in the resonance scheme after moving.

According various example embodiments, a power receiving unit (PRU) (e.g., the external electronic device 101 of FIG. 1) configured to support resonance wireless charging and/or induction wireless charging may include: a wireless charging circuit, a short-range wireless communication circuit, a display, and at least one processor operatively connected to the wireless charging circuit, the short-range wireless communication circuit, and the display. The at least one processor may be configured to: receive a first signal for detecting the power receiving unit from a power transmitting unit through the wireless charging circuit, transmit a feedback of the received first signal to the power transmitting unit through the wireless charging circuit, receive a first power for charging in a resonance scheme through the wireless charging circuit, in response to receiving the first power, perform wireless charging in the resonance scheme, while performing the wireless charging in the resonance scheme, transmit information on a battery state of charge of the power receiving unit to the power transmitting unit through the short-distance wireless communication circuit, receive a control signal for charging using an induction scheme from the power transmitting unit through the short-range wireless communication circuit, and in response to receiving the control signal, output a movement guide through the display.

According to an example embodiment, the movement guide may include a UI for guiding a movement from a resonance wireless charging region to an induction wireless charging region.

Figure 12:
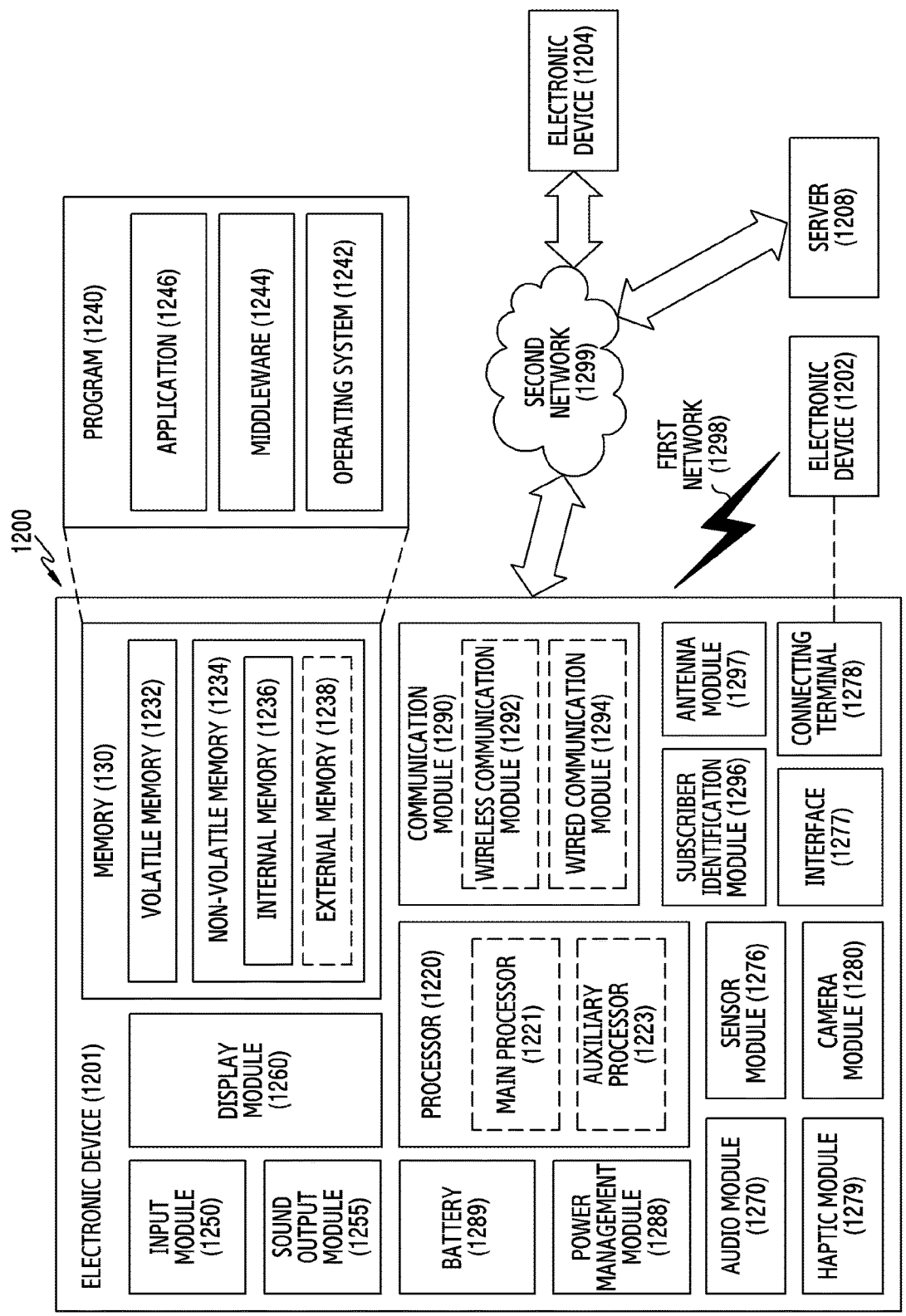
FIG. 12 is a block diagram illustrating an example electronic device in a network environment according to various embodiments.

FIG. 12 is a block diagram illustrating an example electronic device in a network environment according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In various embodiments, at least one of the components (e.g., the connecting terminal 1278) may be omitted from the electronic device 1201, or one or more other components may be added in the electronic device 1201. In various embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In an embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A power transmitting unit (PTU) configured to support resonance wireless charging and induction wireless charging, comprising:
    a first coil for induction wireless charging;
    a second coil for resonance wireless charging;
    a wireless charging circuit electrically connected to the first coil and the second coil;
    a short-range wireless communication circuit; and
    at least one processor operatively connected to the wireless charging circuit and the short-range wireless communication circuit,
    wherein the at least one processor is configured to:
    control the PTU to transmit a first signal for detecting at least one external electronic device through at least one of the first coil and the second coil;
    receive, through the second coil, a feedback of the transmitted first signal from a first external electronic device among the at least one external electronic device;
    in response to receiving the feedback, control the wireless charging circuit and transmit a first power for charging the first external electronic device in a resonance scheme;
    identify whether a first region corresponding to the first coil and being at least partially flat is available;
    based on the first region being available, determine whether to change a charging scheme of the first external electronic device from the resonance scheme to an induction scheme; and
    in response to determining to change the charging scheme of the first external electronic device into the induction scheme, transmit a control signal for charging using the induction scheme to the first external electronic device through the short-range wireless communication circuit.

2. The power transmitting unit of claim 1, wherein the at least one processor is configured to:
    based on identifying that a second external electronic device among the at least one external electronic device is located in the first region, check a battery state of charge (SOC) of the second external electronic device; and
    in response to identifying that the battery state of charge of the second external electronic device is greater than or equal to a threshold level, transmit the control signal for charging using the induction scheme to the first external electronic device.

3. The power transmitting unit of claim 1, wherein the at least one processor is configured to:
    obtain first information on a battery state of charge of the first external electronic device from the first external electronic device through the short-range wireless communication circuit; and based on identifying, based on the first information, that a battery charging level of the first external electronic device is less than or equal to a threshold value, determine whether to change the charging scheme of the first external electronic device from the resonance scheme to the induction scheme.

4. The power transmitting unit of claim 1, wherein the at least one processor is configured to:
obtain first information on a battery state of charge of the first external electronic device from the first external electronic device through the short-range wireless communication circuit;
obtain second information on a battery state of charge of a second external electronic device from the second external electronic device among the at least one external electronic device; and
based on determining, based on the first information and the second information, that the battery charging level of the first external electronic device is lower than a battery charging level of the second external electronic device, determine to change the charging scheme of the first external electronic device from the resonance scheme to the induction scheme.

5. The power transmitting unit of claim 1, wherein the at least one processor is configured to:
obtain a signal comprising a unique identification (ID) from the first external electronic device through the short-range wireless communication circuit, the short-range wireless communication circuit configured for communication using at least one of Bluetooth (BT), Bluetooth low energy (BLE) and ultra-wideband (UWB); and
identify whether the first external electronic device supports all the resonance scheme and the induction scheme, based on the obtained signal.

6. The power transmitting unit of claim 1, wherein the at least one processor is configured to:
obtain a first full charging time and a first charging efficiency while the first external electronic device is charged in the resonance scheme; and
based on transmitting the control signal to the first external electronic device, based on the charging scheme of the first external electronic device being changed from the resonance scheme to the induction scheme, obtain a second full charging time and a second charging efficiency based on the induction wireless charging.

7. A method of operating a power transmitting unit (PTU) configured to support resonance wireless charging and induction wireless charging, the method comprising:
transmitting a first signal for detecting at least one external electronic device through at least one of a first coil for the induction wireless charging and a second coil for the resonance wireless charging;
receiving, through the second coil, a feedback of the transmitted first signal from a first external electronic device among the at least one external electronic device;
in response to receiving the feedback, controlling a wireless charging circuit and transmitting a first power for charging the first external electronic device in a resonance scheme;
identifying whether a first region corresponding to the first coil and being at least partially flat is available;
based on the first region being available, determining whether to change a charging scheme of the first external electronic device from the resonance scheme to an induction scheme; and in response to determining to change the charging scheme of the first external electronic device into the induction scheme, transmitting a control signal for charging using the induction scheme to the first external electronic device through a short-range wireless communication circuit.

8. The method of claim 7, comprising:
based on identifying that a second external electronic device among the at least one external electronic device is located in the first region, checking a battery state of charge of the second external electronic device; and
in response to checking that the battery state of charge of the second external electronic device is greater than or equal to a threshold level, transmitting the control signal for charging using the induction scheme to the first external electronic device.

9. The method of claim 7, comprising:
obtaining first information on a battery state of charge of the first external electronic device from the first external electronic device through the short-range wireless communication circuit; and
based on determining, based on the first information, that a battery charging level of the first external electronic device is less than or equal to a threshold value, determining whether to change the charging scheme of the first external electronic device from the resonance scheme to the induction scheme.

10. The method of claim 7, comprising:
obtaining first information on a battery state of charge of the first external electronic device from the first external electronic device through the short-range wireless communication circuit;
obtaining second information on a battery state of charge of a second external electronic device from the second external electronic device among the at least one external electronic device through the short-range wireless communication circuit; and
based on determining, based on the first information and the second information, that the battery charging level of the first external electronic device is lower than a battery charging level of the second external electronic device, determining to change the charging scheme of the first external electronic device from the resonance scheme to the induction scheme.

11. The method of claim 7, comprising:
obtaining a signal comprising a unique identification (ID) from the first external electronic device through the short-range wireless communication circuit, the short-range wireless communication circuit configured for communication using at least one of BT, BLE, and UWB; and
identifying whether the first external electronic device supports all the resonance scheme and the induction scheme, based on the obtained signal.

12. The method of claim 7, comprising:
obtaining a first full charging time and a first charging efficiency while the first external electronic device is charged in the resonance scheme; and
based on transmitting the control signal to the first external electronic device, based on the charging scheme of the first external electronic device being changed from the resonance scheme to the induction scheme, obtaining a second full charging time and a second charging efficiency based on the induction wireless charging.

13. A power transmitting unit (PTU) configured to support resonance wireless charging and induction wireless charging, comprising:

at least one wireless charging coil;
a wireless charging circuit electrically connected to the at least one wireless charging coil;
a short-range wireless communication circuit; and
at least one processor operatively connected to the wireless communication circuit and the short-range wireless communication circuit,
wherein the at least one processor is configured to:
transmit a first signal for detecting at least one power receiving unit through the at least one wireless charging coil;
receive a feedback of the transmitted first signal from the at least one power receiving unit through the at least one wireless charging coil;
in response to receiving the feedback, identify a first power receiving unit that supports the resonance wireless charging and does not support the induction wireless charging among the at least one power receiving unit;
control the wireless charging circuit and transmit a first power for charging the identified first power receiving unit in a resonance scheme;
obtain information on a battery state of charge of the first power receiving unit from the first power receiving unit through the short-range wireless communication circuit;
determine whether a charging level of the first power receiving unit is less than or equal to a threshold value, based on the obtained information on the state of charge; and
in response to determining that the charging level of the first power receiving unit is less than or equal to the threshold value, transmit a signal instructing a movement of the first power receiving unit through the short-range wireless communication circuit.

14. The power transmitting unit of claim 13, wherein, based on determining that the first power receiving unit is located outside a resonance charging region, the at least one processor is configured to transmit the signal instructing the movement of the first power receiving unit.

15. The power transmitting unit of claim 13, wherein, based on determining that two or more power receiving units comprising the first power receiving unit are located in a region corresponding to one coil for transmitting a power for the resonance wireless charging among the at least one wireless charging coil, the at least one processor is configured to transmit the signal instructing the movement of the first power receiving unit.

16. The power transmitting unit of claim 13, wherein, based on determining that a distance between the first power receiving unit and the second power receiving unit among the at least one power receiving unit is less than or equal to a threshold value, the at least one processor is configured to transmit the signal instructing the movement of the first power receiving unit.

17. The power transmitting unit of claim 13, wherein the at least one processor is configured to:
obtain a signal comprising a unique identification (ID) from the first power receiving unit through the short-range wireless communication circuit, the short-range wireless communication circuit being configured for communication using at least one of BT, BLE, and UWB; and
identify whether the first power receiving unit supports the resonance scheme, based on the obtained signal.

18. The power transmitting unit of claim 13, wherein the at least one processor is configured to:
obtain a first full charging time and a first charging efficiency while the first power receiving unit is charged in the resonance scheme before moving; and
in response to receiving a signal indicating that the first power receiving unit moves, obtain a second full charging time and a second charging efficiency while the first power receiving unit is charged in the resonance scheme after moving.

19. A power receiving unit (PRU) configured to support resonance wireless charging and/or induction wireless charging, comprising:
a wireless charging circuit;
a short-range wireless communication circuit;
a display; and
at least one processor operatively connected to the wireless charging circuit, the short-range wireless communication circuit, and the display,
wherein the at least one processor is configured to:
receive a first signal for detecting the power receiving unit from a power transmitting unit through the wireless charging circuit;
transmit a feedback of the received first signal to the power transmitting unit through the wireless charging circuit;
receive a first power for charging in a resonance scheme through the wireless charging circuit;
in response to receiving the first power, perform wireless charging in the resonance scheme;
while performing the wireless charging in the resonance scheme, transmit information on a battery state of charge of the power receiving unit to the power transmitting unit through the short-distance wireless communication circuit;
receive a control signal for charging using an induction scheme from the power transmitting unit through the short-range wireless communication circuit; and
in response to receiving the control signal, output a movement guide through the display.

20. The power receiving unit of claim 19, wherein the movement guide comprises a UI for guiding a movement from a resonance wireless charging region to an induction wireless charging region.

* * * * *